US008195581B2

(12) United States Patent
Backstrom et al.

(10) Patent No.: US 8,195,581 B2
(45) Date of Patent: Jun. 5, 2012

(54) APPARATUS AND METHOD FOR SIMULATING MULTI-DIMENSIONAL NON-LINEAR MULTIVARIABLE PROCESSES

(75) Inventors: Johan U. Backstrom, North Vancouver (CA); Mattias Bjorklund, North Vancouver (CA); Cheul Chung, North Vancouver (CA)

(73) Assignee: Honeywell ASCa Inc., Ontario (CA)

( * ) Notice: Subject to any disclaimer, the term of this patent is extended or adjusted under 35 U.S.C. 154(b) by 658 days.

(21) Appl. No.: 11/804,811

(22) Filed: May 21, 2007

(65) Prior Publication Data

US 2008/0294419 A1 Nov. 27, 2008

(51) Int. Cl.
G06G 7/48 (2006.01)
(52) U.S. Cl. ............................................ 706/6; 700/128
(58) Field of Classification Search .................. 382/141; 162/123; 700/127, 128, 108, 109; 703/2, 703/6, 7, 13
See application file for complete search history.

(56) References Cited

U.S. PATENT DOCUMENTS

| 6,056,781 | A * | 5/2000 | Wassick et al. | 703/12 |
|---|---|---|---|---|
| 6,086,716 | A * | 7/2000 | Watson et al. | 162/198 |
| 6,185,468 | B1 * | 2/2001 | Wells | 700/30 |
| 6,807,510 | B1 * | 10/2004 | Backstrom et al. | 702/150 |
| 7,496,413 | B2 * | 2/2009 | Fan et al. | 700/29 |
| 2003/0050717 | A1 * | 3/2003 | Hirata et al. | 700/90 |
| 2008/0183311 | A1 * | 7/2008 | MacArthur et al. | 700/29 |

OTHER PUBLICATIONS

Jayati Ray Dutta, Pranab Kumar Dutta, Rintu Banerjee; Modeling and optimization of protease productionby a newly isolated Pseudomonas sp. using genetic algorithm; Feb. 2005; Elsevier ; vol. 40 Issue 2; pp. 879-884.*
Ikonen et al., Modelling of Pulp Flow Rate with Variable Consistency, 2000, Springer-Verlag London Limited, pp. 165-171.*
Fan, ModelPredictive Control for Multiple Cross-Directional Processes: Analysis, Tuning, and Implementation, Sep. 2003, The University of British Columbia, pp. 1-172.*
"Robust Multivariable Predictive Control Technology, Profit Controller Designer's Guide, for Profit Controller R160, R200 and R205," (relevant sections 6 & 7, pp. 49-69), Rev. 6.2, Aug. 2002, 151 pages.
Murphy et al., Intelligent Control for Paper Machine Moisture Control, Proceedings of the 1996 IEEE Conf., pp. 826-833, Sep. 15, 1996, NY, NY, USA.
Slatteke O., Object-Oriented Modeling and Predictive Control of the Moisture Content in Paper Production, American Control Conf., pp. 5544-5549, Jun 14, 2006, Minn, MN, USA.

* cited by examiner

*Primary Examiner* — Dwin M Craig
*Assistant Examiner* — Bernard E Cothran

(57) ABSTRACT

A process simulator is provided for simulating the behavior of multi-dimensional non-linear multivariable processes. A multi-dimensional non-linear multivariable model of a process can be generated, such as by using smaller building blocks. One or more inputs are provided to the model, a behavior of the process is simulated in real-time using the model, and one or more outputs of the model are provided. The model could represent a two-dimensional non-linear multivariable model, and the one or more inputs to the model and/or the one or more outputs of the model could be array-based. The process simulator could be formed from multiple components, such as a regulatory loop simulator object, a process model object, a disturbance generator object, and a scanner simulator object. The arrangement of the objects can be flexible and configurable, such as by designing the objects in an object-oriented manner utilizing a sink/source architecture.

23 Claims, 10 Drawing Sheets

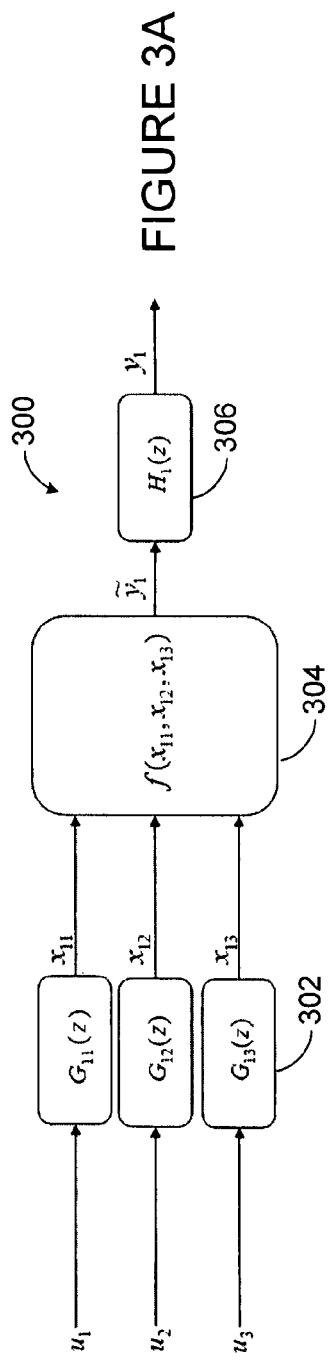
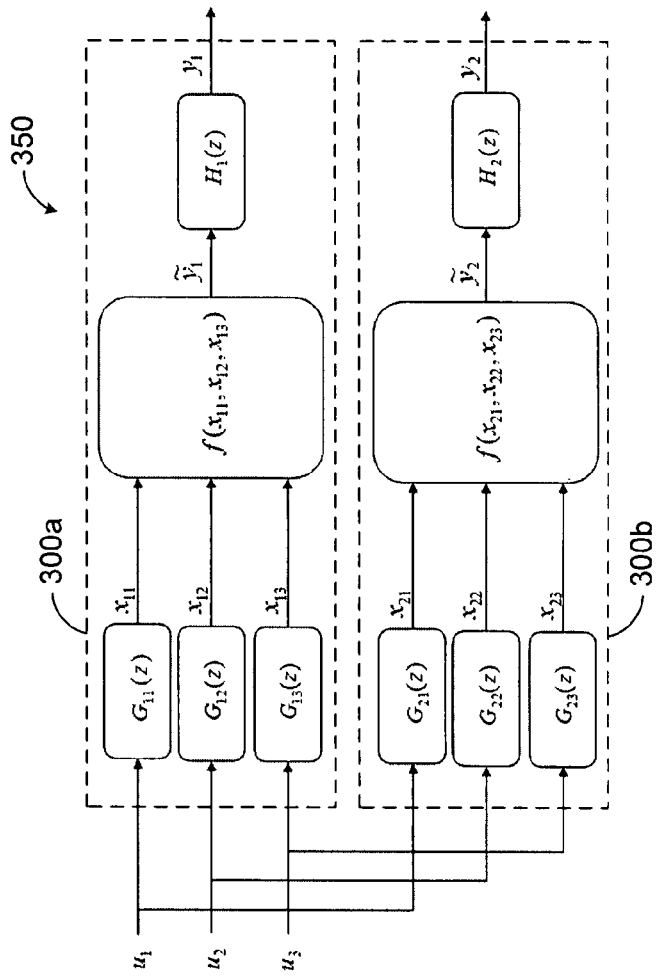
FIGURE 3A
FIGURE 3B

APPARATUS AND METHOD FOR SIMULATING MULTI-DIMENSIONAL NON-LINEAR MULTIVARIABLE PROCESSES

TECHNICAL FIELD

This disclosure relates generally to simulation systems and more specifically to an apparatus and method for simulating multi-dimensional non-linear multivariable processes.

BACKGROUND

Many different systems perform or implement multi-dimensional non-linear multivariable processes. The systems are "non-linear" in that one or more outputs of the system do not respond linearly to changes in one or more inputs of the system. The systems are "multivariable" in that multiple inputs of the system can be used to make adjustments to one or more outputs of the system. The systems are "multi-dimensional" in that they have multiple dimensions, such as a spatial dimension and a temporal dimension.

Ideally, the behavior of these types of processes could be simulated, which could be done to support a wide variety of functions. For example, these simulations could be done for in-house validation of new control systems, realistic customer acceptance tests, system checkouts, and training of machine operators and process engineers. However, there are several problems with designing or configuring a multi-dimensional non-linear multivariable process simulator. For example, it is often very expensive to derive the non-linear dynamic and spatial process models that represent a multi-dimensional non-linear multivariable process. Also, the resulting set of non-linear differential equations or partial differential equations representing a multi-dimensional non-linear multivariable process can be very time consuming to solve, often rendering them unsuitable for real-time use.

As a particular example, various systems are available and used to manufacture sheets of paper or other sheet products. These types of sheet-making systems are non-linear in that changes to various manipulated variables (such as an amount of drying applied to the sheet) result in non-linear changes to one or more controlled variables (such as moisture of the sheet). These types of sheet-making systems are multivariable in that multiple manipulated variables can be analyzed and used to adjust one or more controlled variables. The spatial and temporal dimensions in this example correspond to the cross direction (CD) and machine direction (MD) of a paper machine. In the context of a paper making process, "spatial" and "cross direction" can be used interchangeably. Also, "temporal," "dynamic," and "machine direction" can be used interchangeably.

Prior techniques for simulating the behaviors of these types of sheet-making systems have often involved separate linear multivariable CD and linear multivariable MD simulators. Some techniques also provided for the ability to simulate the behavior of low-level controllers in the sheet-making systems. However, these prior techniques often lacked any mechanism for simulating the behavior of MD or CD actuators, simulating the effects of a scanning set of sensors, and simulating different types of MD and CD disturbances. These prior techniques also often lacked any mechanism for simulating non-linear characteristics of a process in real time.

SUMMARY

This disclosure provides an apparatus and method for simulating multi-dimensional non-linear multivariable processes.

In a first embodiment, a method includes generating a multi-dimensional non-linear multivariable model of a process. The method also includes providing one or more inputs to the model. The method further includes simulating a behavior of the process using the model in real-time. In addition, the method includes providing one or more outputs of the model. The one or more outputs identify the simulated behavior of the process.

In particular embodiments, a user constructs the model using one or more building blocks, such as a single input, single output (SISO) model and/or a multiple input, single output (MISO) model.

In other particular embodiments, the one or more inputs to the model are determined by receiving one or more regulatory loop process value setpoints and simulating regulatory control dynamics in the process to produce one or more simulated changes to one or more process variables. The one or more process variables are associated with the process.

In yet other particular embodiments, simulating the behavior of the process using the model and providing the one or more outputs of the model include receiving the one or more simulated changes to the one or more process variables. The model is used to determine how the one or more simulated changes to the one or more process variables affect one or more simulated variables. The one or more simulated variables are associated with the process. One or more values associated with the one or more simulated variables are then output. A disturbance in the one or more values associated with the one or more simulated variables can be simulated. A disturbance in the one or more values associated with the one or more process variables can also be simulated. In addition, measurements of the one or more simulated variables by one or more sensors can be simulated to produce a simulated measurement profile.

In still other particular embodiments, the model includes a multi-dimensional non-linear multivariable model associated with a moisture of a paper sheet produced by a paper machine and/or a multi-dimensional non-linear multivariable model associated with a dry weight of the paper sheet. Also, the one or more outputs of the model and/or one or more values based on the one or more outputs of the model can be provided to a quality control system associated with the paper machine.

In a second embodiment, an apparatus includes at least one memory operable to store a multi-dimensional non-linear multivariable model of a process. The apparatus also includes at least one processor operable to provide one or more inputs to the model, simulate a behavior of the process using the model in real-time, and provide one or more outputs of the model. The one or more outputs identify the simulated behavior of the process.

In a third embodiment, a computer program is embodied on a computer readable medium. The computer program includes computer readable program code for providing one or more inputs to a multi-dimensional non-linear multivariable model. The computer program also includes computer readable program code for simulating a behavior of the process using the model in real-time. The computer program further includes computer readable program code for providing one or more outputs of the model. The one or more outputs identify the simulated behavior of the process.

In a fourth embodiment, a system includes a process simulator, which includes a plurality of components. The components include a multi-dimensional non-linear multivariable model of a process. The process simulator is operable to use the model to simulate a behavior of the process in real-time.

In particular embodiments, the components also include a regulatory loop simulator operable to simulate regulatory loop dynamics in the process, a disturbance generator operable to simulate a disturbance in one or more values associated with the simulation of the process, and a scanner simulator operable to simulate measurements by one or more sensors in the process.

In other particular embodiments, the process simulator has a sink/source architecture where a number of each of the components, an arrangement of the components, and connections associated with inputs and outputs of the components are configurable. For example, the components may represent distributable objects defined in an object-oriented programming environment, where the components are accessible to both local and remote simulation clients.

In still other particular embodiments, the process represents an industrial process, the system further includes a configuration file associated with the industrial process, and the process simulator is operable to configure the components based on the configuration file.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A and 3B illustrate example multi-dimensional non-linear multivariable process models in accordance with this disclosure;

DETAILED DESCRIPTION

Figure 1A:
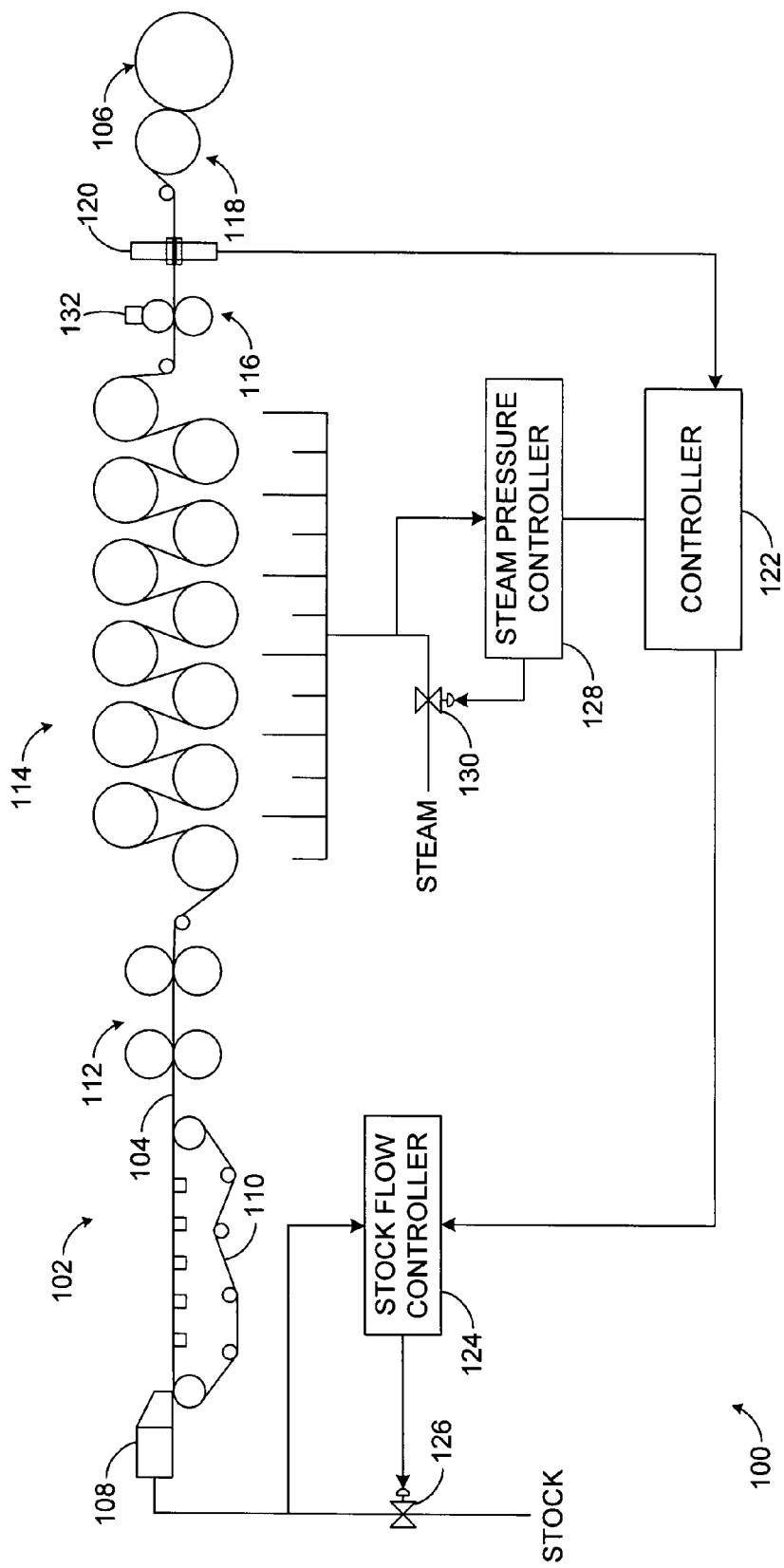
FIGS. 1A and 1B illustrate an example paper production system in accordance with this disclosure.
Figure 1B:
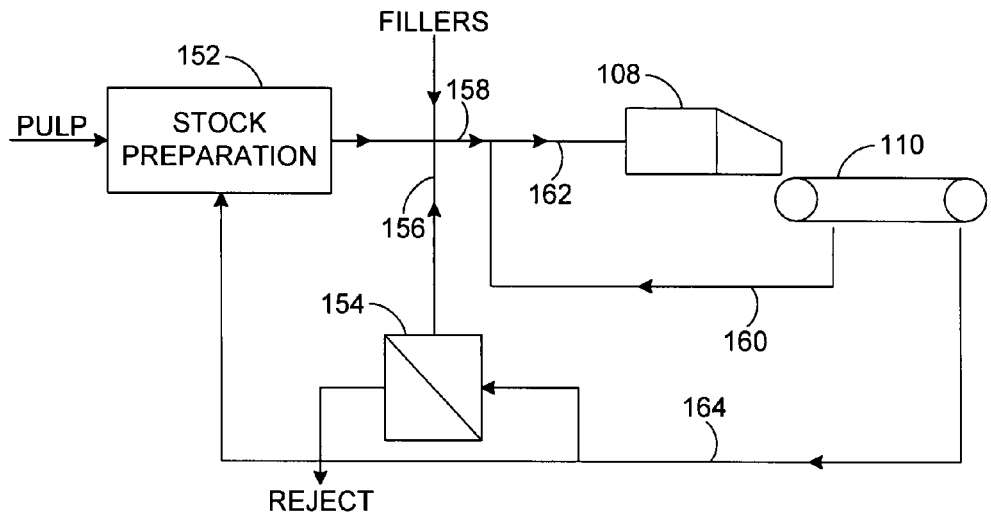

FIGS. 1A and 1B illustrate an example paper production system 100 according to one embodiment of this disclosure. The embodiment of the paper production system 100 shown in FIGS. 1A and 1B is for illustration only. Other embodiments of the paper production system 100 may be used without departing from the scope of this disclosure.

As shown in FIG. 1A, the paper production system 100 includes a paper machine 102. The paper machine 102 includes various components used to produce or process a paper product. In this example, the various components may be used to produce a paper sheet 104 collected at a reel 106.

In this example embodiment, the paper machine 102 includes a headbox 108, which distributes a pulp suspension uniformly across the machine onto a continuous moving screen or mesh 110. The pulp suspension entering the headbox 108 may contain, for example, 0.2-3% wood fibers and possibly other solids, with the remainder of the suspension being water. The headbox 108 includes any suitable structure for distributing a pulp suspension. The headbox 108 may, for example, include a slice opening through which the pulp suspension is distributed onto the screen or mesh 110. The screen or mesh 110 represents any suitable structure for receiving a pulp suspension and allowing water or other materials to drain or leave the pulp suspension.

The sheet 104 then enters a press section 112, which includes multiple press rolls. The sheet 104 travels through the openings (referred to as "nips") between pairs of counter-rotating rolls in the press section 112. In this way, the rolls in the press section 112 compress the sheet 104, which may help to remove more water from the sheet 104. The press section 112 may include any suitable number of press rolls in any suitable arrangement for pressing the sheet 104.

The sheet 104 next enters a dryer section 114, which includes a series of heated rolls. The sheet 104 travels over the heated rolls, which heats the sheet 104 and causes more water in the sheet 104 to evaporate. Steam or any other heated substances can be used to impart heat to the heated rolls in the dryer section 114. The dryer section 114 may include any suitable number of heated rolls in any suitable arrangement for heating the sheet 104 and removing water from the sheet 104.

A calendar 116 processes and finishes the sheet 104. For example, the calendar 116 may smooth the sheet 104 and impart a final finish, thickness, gloss, or other characteristic to the sheet 104. Other materials (such as starch or wax) can also be added to the sheet 104 to obtain the desired finish. The calendar 116 may include any suitable number of calendar stacks in any suitable arrangement for finishing the sheet 104. Once processing by the calendar 116 is complete, a reel device 118 collects the sheet 104 onto the reel 106.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. For instance, additional components could be used to further process the paper sheet 104 before it is collected at the reel 106, such as a supercalender for improving the paper sheet's thickness, smoothness, and gloss. In addition, this disclosure is not limited to use with systems for producing or processing paper products and could be used with systems that produce or process other items or materials, such as plastic, textiles, metal foil or sheets, or other or additional materials.

In order to control the paper-making process, the properties of the sheet 104 may be continuously or repeatedly measured and the paper machine 102 adjusted to ensure sheet quality. This control may be achieved by measuring sheet properties using a scanner 120. The scanner 120 is capable of scanning the sheet 104 and measuring one or more characteristics of the sheet 104. For example, the scanner 120 could carry sensors for measuring the basis weight, moisture content, ash content, or any other or additional characteristics of the sheet 104. The scanner 120 includes any suitable structure or structures for measuring or detecting one or more characteristics of the sheet 104, such as a set or array of sensors. A scanning set of sensors represents one particular embodiment for measuring sheet properties. Other embodiments could include using a stationary set or array of sensors. Also, while one scanner 120 is shown at one particular location of the paper machine 102, other or additional sensors could be used at other or additional locations of the paper machine 102.

Measurements from the scanner 120 are provided to a controller 122. The controller 122 controls various operations of the paper machine 102 that affect characteristics of the sheet 104. In general, the system 100 is associated with various "process variables," which represent various aspects of the system 100 (such as speed, flow rate, or pressure). When the system 100 is used to manufacture the sheet 104, the controller 122 attempts to maintain a "controlled variable" (CV) at or near a desired value or within a desired range, such as by maintaining a moisture content of the sheet 104 within a specified range. The controller 122 attempts to maintain the controlled variable by altering one or more "manipulated variables" (MVs), such as by adjusting an opening of a valve or a speed of the paper machine 102. A "disturbance variable" (DV) represents a process variable that affects a controlled variable, where the disturbance variable can be considered by the controller 122 when altering the manipulated variables but generally cannot be controlled by the controller 122 (such as ambient temperature). By controlling certain controlled variables using certain manipulated variables, the controller 122 may increase or optimize the production of the sheet 104.

The controller 122 may control various operations of the paper machine 102 that affect machine direction (MD) and cross direction (CD) characteristics of the sheet 104. A cross direction characteristic of the sheet 104 generally refers to a characteristic of the sheet 104 that varies and is controlled across the sheet 104. A machine direction characteristic of the sheet 104 generally refers to an average of the cross direction characteristic of the sheet 104 that varies and is controlled in the machine direction (the direction of travel of the sheet 104). The controller 122 includes any hardware, software, firmware, or combination thereof for controlling the operation of a paper or other machine.

In this example, the controller 122 is capable of controlling the supply of pulp to the headbox 108. For example, the controller 122 could provide information to a stock flow controller 124, which controls a valve 126. The stock flow controller 124 generally controls the opening and closing of the valve 126 to control the flow of stock (a mixture of pulp, filler, water, and other materials) to the headbox 108. The stock flow controller 124 uses information from the controller 122 as well as measurements of the stock flow to the headbox 108 to control the valve 126.

In this example, the controller 122 is also capable of controlling the supply of steam to the dryer section 114. For example, the controller 122 could provide information to a steam pressure controller 128, which controls a valve 130. The steam pressure controller 128 generally controls the opening and closing of the valve 130 to control the steam pressure in the dryer section 114. In this way, the steam pressure controller 128 controls the heating of the rolls in the dryer section 114, thereby controlling the amount of drying provided by the dryer section 114. The steam pressure controller 128 uses information from the controller 122 as well as measurements of the steam pressure to control the valve 130.

The stock valve 126 and the steam valve 130 may generally be referred to as MD actuators since they affect and are adjusted to control MD characteristics of the sheet 104. The controller 122 (or another controller) is further capable of controlling various CD actuators in the paper machine 102. For example, the controller 122 could control the operation of an array of dilution actuators and an array of slice lip actuators in the headbox 108. The dilution actuators distribute dilution water into the pulp suspension across the sheet 104. The slice lip actuators control a slice opening across the machine from which the pulp suspension exits the headbox 108 onto the screen or mesh 110. As another example, the controller 122 could control an array of induction heating actuators 132, which heat the shell surface of the calendar roll 116. This allows the controller 122 to control the compression of the sheet 106 after the calendar roll 116. A set or array of sensors or actuators may be said to reside on or form a sensor or actuator "beam." These represent examples of the various types of MD and CD actuators that could be used in the paper machine 102. Other or additional actuators could also be used.

The stock provided to the headbox 108 is produced as shown in FIG. 1B. Here, pulp is provided to a stock preparation unit 152. The stock preparation unit 152 processes the pulp to prepare the pulp for use in making the sheet 104. For example, the stock preparation unit 152 could clean and refine the pulp fibers so that the pulp fibers have desired properties. The stock preparation unit 152 could also receive and process recycled fibers recovered from the screen or mesh 110. The stock preparation unit 152 includes any suitable structure(s) for preparing fibers or other materials for use in a paper machine.

The fibers provided by the stock preparation unit 152 can be mixed with one or more fillers and with recycled materials provided by a retention unit 154. The resulting mixture represents a thick stock 158 and has a relatively high fiber consistency (such as around 4%). The thick stock 158 is then mixed with white water in a short circulation path 160 to produce a thin stock 162. The thin stock 162 has a relatively low fiber consistency (such as around 0.2%). The thin stock 162 is provided to the headbox 108 for use in forming the sheet 104. A long circulation path 164 provides recycled material to the retention unit 154 and the stock preparation unit 152 for recovery. The retention unit 154 may reject some of the material provided through the long circulation path 164.

In one aspect of operation, the entire paper production system 100 can be modeled using a multi-dimensional non-linear multivariable process model. Moreover, the behavior of the paper production system 100 can be simulated using the multi-dimensional non-linear multivariable process model in real time. Additional details regarding the simulation of this or other multi-dimensional non-linear multivariable processes are provided in the following description.

In particular embodiments, a simulator that uses is a multi-dimensional process model can be modular and separable. Among other things, this may allow for simulating simpler processes, such as processes having only a temporal dimension or only a spatial dimension. As a particular example, one or more spatial models could be defined for supporting multi-dimensional process model simulations, while the spatial models could be omitted to support single-dimensional process model simulations.

Although FIGS. 1A and 1B illustrate one example of a paper production system 100, various changes may be made to FIGS. 1A and 1B. For example, other systems could be used to produce or process paper products or other products. Also, while shown as including three controllers, the controllers could be combined or further subdivided, and the production system 100 could include additional control functionality for controlling other aspects of the system 100. In addition, FIGS. 1A and 1B illustrate one example process that can be modeled using a non-linear multivariable process model. The modeling and simulation functionality described in this patent document could be used with any other suitable system or process.

Figure 2A:
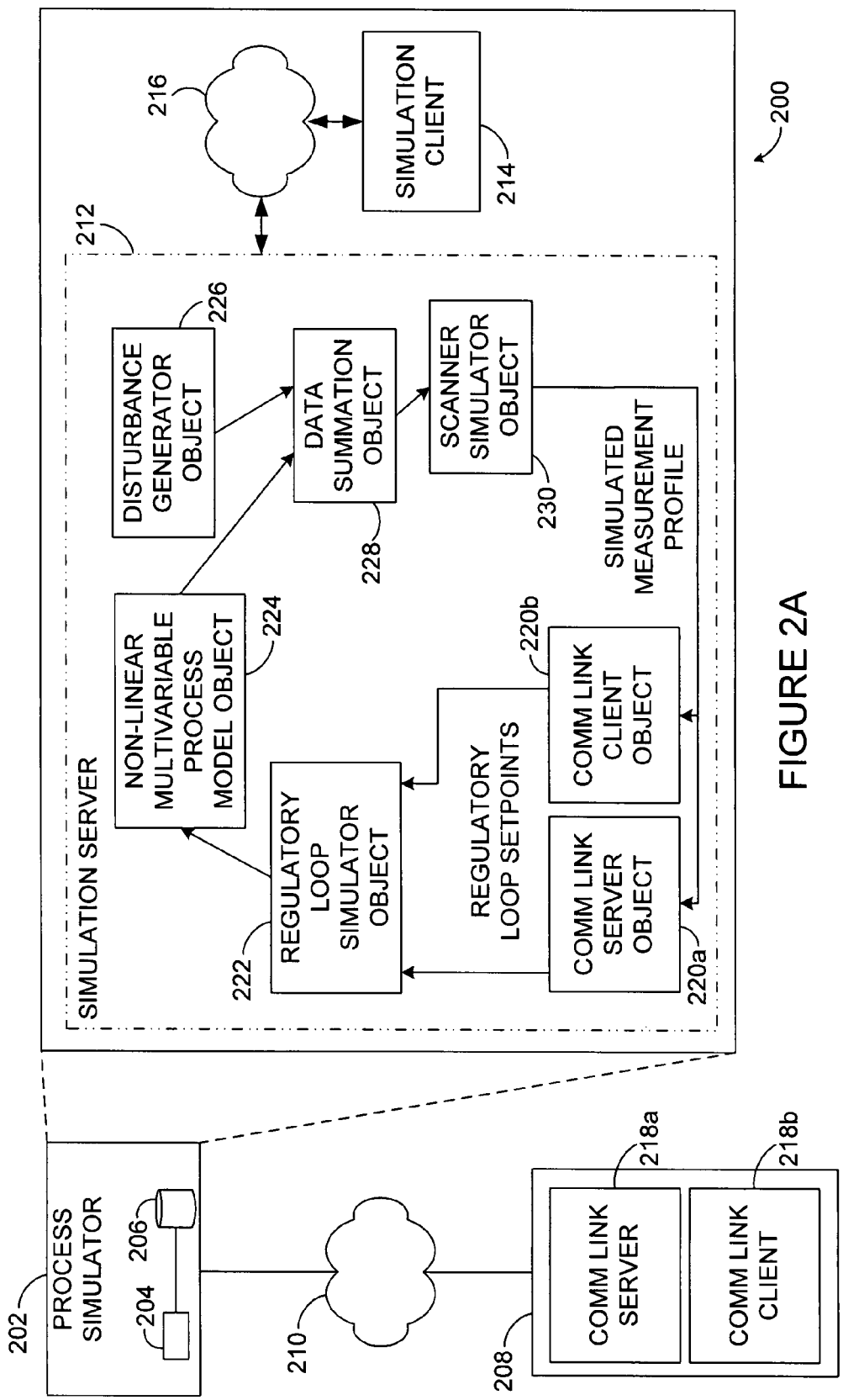
FIGS. 2A through 2C illustrate an example system for simulating a multi-dimensional non-linear multivariable process in accordance with this disclosure.
Figure 2B:
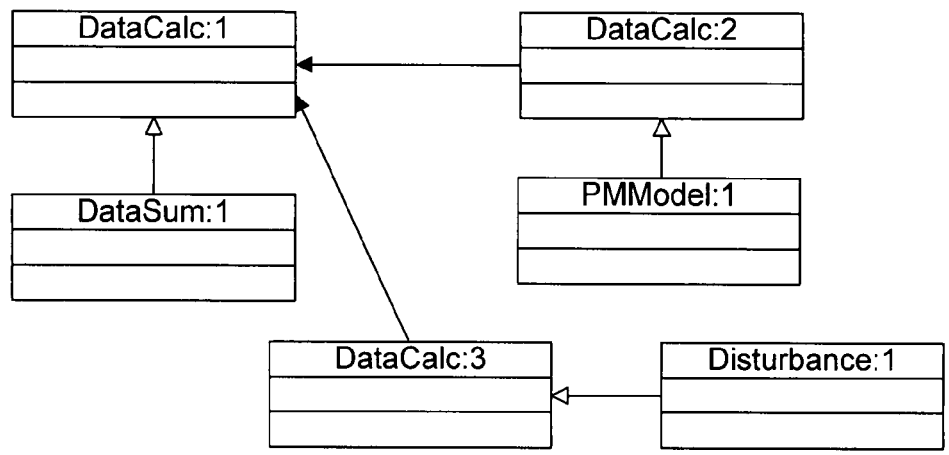
Figure 2C:
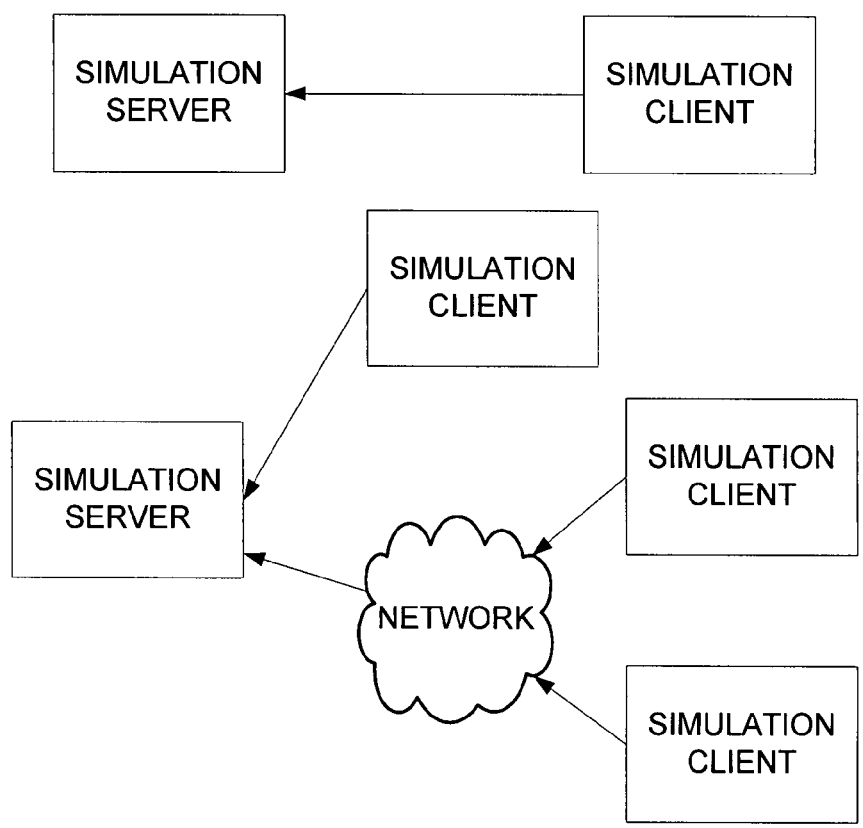

FIGS. 2A through 2C illustrate an example system 200 for simulating a multi-dimensional non-linear multivariable process in accordance with this disclosure. The embodiment of the system 200 shown in FIGS. 2A through 2C is for illustration only. Other embodiments of the system 200 could be used without departing from the scope of this disclosure. Also, for ease of explanation, the system 200 is described as modeling the paper production system 100 of FIGS. 1A and 1B. The system 200 could be used with any other suitable system or process.

As shown in FIG. 2A, the system 200 includes a process simulator 202. The process simulator 202 operates to simulate multi-dimensional non-linear multivariable processes in real-time. For example, the process simulator 202 may allow a user to define a multi-dimensional non-linear multivariable process, such as in graphical or other form using simpler building blocks. The process simulator 202 then simulates how the multi-dimensional non-linear multivariable process behaves in real-time.

By enabling simulation of a multi-dimensional non-linear multivariable process in real-time, the process simulator 202 enables a wide range of activities associated with the process being simulated. For example, new control systems can be validated using the simulated multi-dimensional non-linear multivariable process. Also, realistic customer acceptance tests of new systems and system checkouts can be performed using the simulated multi-dimensional non-linear multivariable process. In addition, appropriate personnel can be trained using the simulated multi-dimensional non-linear multivariable process.

The process simulator 202 includes any suitable hardware, software, firmware, network, or combination thereof for simulating non-linear multivariable processes. As a particular example, the process simulator 202 could include one or more computing devices, each of which may include at least one processor 204 and at least one memory 206 for storing instructions and data used, generated, or collected by the processor(s) 204.

The data used or generated by the process simulator 202 can be used in any suitable manner in the system 200. For example, the data used or generated by the process simulator 202 could be stored in or provided to one or more external components in the system 200. In this example embodiment, the data used or generated by the process simulator 202 is provided by or to a data source/destination 208, which is coupled to the process simulator 202 through a network 210. The data source/destination 208 represents any suitable source of process-related data that can be used by the process simulator 202 and/or any suitable destination of process-related data that is generated by the process simulator 202. For instance, in some embodiments, the process simulator 202 is used to simulate the behavior of a paper or other sheet-making process. In these embodiments, the data source/destination 208 may represent a device or system for storing information associated with the operation of the sheet-making process. Also, the results of any simulations can be made available to the data source/destination 208 for use in controlling the sheet-making process. As a particular example, the data source/destination 208 could represent a DA VINCI quality control system (QCS) application server from HONEYWELL INTERNATIONAL INC.

The network 210 facilitates communication between components of system 200. For example, the network 210 may communicate Internet Protocol (IP) packets, frame relay frames, Asynchronous Transfer Mode (ATM) cells, or other suitable information between network addresses. The network 210 may include one or more local area networks (LANs), metropolitan area networks (MANs), wide area networks (WANs), all or a portion of a global network such as the Internet, or any other communication system or systems at one or more locations. The network 210 may also operate according to any appropriate type of protocol or protocols, such as Ethernet, IP, X.25, frame relay, or any other packet data protocol.

In this example embodiment, the process simulator 202 includes a simulation server 212 and a simulation client 214. Each of these components includes sub-components capable of performing various functions. Each of the components and sub-components in the process simulator 202 includes any suitable hardware, software, firmware, or combination thereof for performing the desired function(s) of that component or sub-component. Also, the simulation server 212 and the simulation client 214 may reside on or be supported by the same device or separate devices. As a particular example, the simulation server 212 may execute on one processor, while the simulation client 214 may execute on another processor and communicate with the simulation server 212 via a network 216. The network 216 includes any suitable communication system(s) that operate(s) according to any appropriate type of protocol (s). The network 216 could also be omitted, and the simulation server 212 and the simulation client 214 could communicate over the network 210.

The simulation server 212 includes a simulator algorithm and additional functions and infrastructure for the simulator (such as loading and saving a configuration of the simulator to a file). The simulation client 214 provides users with a mechanism for configuring and invoking execution of the simulator, such as by supporting a graphical user interface.

In this example, the simulation server 212 includes various objects that are arranged to provide simulation and other functionality. For example, the simulation server 212 includes a communication link server object 220a and a communication link client object 220b, such as Object Linking and Embedding (OLE) for Process Control (OPC) objects. The communication link objects 220a-220b represent or support a communication interface between the process simulator 202 and the data source/destination 208. The data source/destination 208 could have a corresponding communication link server 218a and a communication link client 218b, which facilitate communication between the data source/destination 208 and the simulation server 212 over the network 210. The communication link objects 220a-220b may, for example, allow the process simulator 202 to send and retrieve data to and from a DA VINCI application server over the network 210. The data received may include regulatory loop setpoints or process values, which represent the desired values of one or more manipulated variables associated with the process being simulated. As an example, in order to maintain moisture and dry weight, the data source/destination 208 could generate regulatory loop setpoints for the stock flow and steam regulatory control loops.

The simulation server 212 also includes a regulatory loop simulator object 222. The regulatory loop simulator object 222 simulates the behavior of various controllers in the process being simulated. For example, if the process simulator 202 is modeling and simulating the paper production system 100, the regulatory loop simulator object 222 could simulate the behavior of the controller 122, the stock flow controller 124, and the steam pressure controller 128. The regulatory loop simulator object 222 could simulate the behavior of any other or additional control logic in the process being modeled.

A multi-dimensional non-linear multivariable process model object 224 represents the non-linear multivariable process being simulated. For example, the multi-dimensional non-linear multivariable process model object 224 could estimate the behavior of a sheet-making process, such as the paper production system 100. The process model object 224 could then be used to estimate the properties of the sheet 104 based on various simulated control signals provided by the controller 122, the stock flow controller 124, and the steam pressure controller 128. As a particular example, the multi-dimensional non-linear multivariable process model object 224 could be used to estimate the properties of the sheet 104 (such as moisture or dry weight) based on the stock flow(s) and steam pressure(s) simulated by the regulatory loop simulator object 222.

A disturbance generator object 226 generates simulated disturbances, which are added to or subtracted from the outputs of the multi-dimensional non-linear multivariable process model object 224 using a data summation object 228. For example, the disturbance generator object 226 could add a small amount of noise to the modeled properties of the sheet 104 that are provided by the multi-dimensional non-linear multivariable process model object 224. The disturbance generator object 226 could also generate simulated disturbances in other values associated with the process being simulated. The use of the disturbance generator object 226 and data summation object 228 is optional, and these components can be omitted from the process simulator 202.

A scanner simulator object 230 simulates scanning sensors that (in real life) measure product properties or other characteristics in the process being simulated. For example, the scanner simulator object 230 could simulate the measurements of a sheet 104 taken by the scanner 120. In some embodiments, simulated paper properties are not sent directly to a DA VINCI application server or other destination. Instead, the simulated paper properties are passed through the scanner simulator object 230, which leads the DA VINCI application server or other destination to believe that it is receiving real scanner measurements from a real process. However, in other embodiments, the simulated paper properties can be sent directly to a destination, and the use of the scanner simulator object 230 may not be required (such as when a measurement device is a stationary sensor or array of sensors).

In one aspect of operation, a user can use the simulation client 214 to access the simulation server 212 and define a non-linear multivariable process model object 224. The model object 224 could represent a simple or very complex multi-dimensional non-linear multivariable process. One technique for allowing users to define multi-dimensional non-linear multivariable process models using simpler building blocks is shown in FIGS. 3A and 3B, which are described below. Once a multi-dimensional non-linear multivariable process model object 224 is defined, the simulation server 212 can simulate the behavior of the multi-dimensional non-linear multivariable process using the process model object 224. For example, the simulation server 212 can receive regulatory loop setpoints and simulate execution of regulatory loop dynamics using the regulatory loop simulator object 222. The outputs from this simulation may represent simulated process variables, such as steam pressure or stock flow, in the production system 100. These signals are provided as inputs to the non-linear multivariable process model object 224, which uses these signals to simulate one or more properties of the paper sheet 104 (such as moisture or dry weight). The multi-dimensional non-linear multivariable process model object 224 may then output signals simulating various paper sheet properties that are simulated based on the inputs to the multivariable process model object 224. An arbitrary disturbance generated by the disturbance generator object 226 can be added to these simulated paper sheet properties. The simulated paper sheet properties can also be processed by the scanner simulator object 230, which produces a simulated measurement profile. The simulated measurement profile represents estimated measurements of the one or more paper sheet properties. All of these actions could occur in real-time, allowing the simulation of the non-linear multivariable process to occur rapidly.

In some embodiments, the process simulator 202 has a sink/source architecture. For example, all of the components of the simulation client 212 could represent objects created in an object-oriented programming environment, where the objects are derived from a base class designed with a sink/source architecture. FIG. 2B illustrates one example embodiment of this design. In FIG. 2B, a DataSum object (data summation object 228) is derived from a base DataCalc class. The DataSum object subscribes to a PMModel object (process model object 224), which is also derived from the Data-Calc class. The DataSum object also subscribes to a Disturbance object (disturbance generator object 226). Whenever the data output by the PMModel object or the Disturbance object changes in value, an event mechanism of the sink/source architecture implemented within the DataCalc class notifies the data sink, which in this case is the DataSum object. The DataSum object may then take the outputs of the objects as inputs and undertake appropriate operations on the data, which in this case involves summing the two inputs together. In these embodiments, since all components (objects) in the process simulator 202 are derived from a base class such as DataCalc, the output from one arbitrary component can be used as an input to another arbitrary component in the process simulator 202. For instance, the output from the multi-dimensional non-linear process model object 224 can be used as an input to the regulatory loop simulator object 222, even though this may not be motivated in the simulation of a real process. As other examples, multiple process model objects 224 could receive inputs from one regulatory loop simulator object 222, or the communication link objects 220a-220b could be coupled directly to the input of the process model object 224. Using this architecture, the objects in the process simulator 202 can be created in any number and can be connected with each other in any desired manner.

In particular embodiments, the regulatory loop simulator object 222 simulates regulatory controllers and their low level processes. The regulatory loop simulator object 222 may support both MD regulatory controller and CD regulatory controller simulations. For example, the regulatory loop simulator object 222 may include an MD regulatory loop simulator that models the behavior of the regulatory MD controllers 124 and 128. The MD regulatory loop simulator can receive process variable setpoints and regulatory controller mode requests as inputs. The MD regulatory loop simulator can also output process variable process values for the process model object 224 and output process variable process values, process variable limits, mode, and status for supervisory MD controls in the data source/destination 208. The regulatory loop simulator object 222 may also include a CD regulatory loop simulator that models the behavior of regulatory CD controllers. The CD regulatory loop simulator can receive CD setpoint requests and mode requests from supervisory CD controls in the data source/destination 208. The CD regulatory loop simulator can also model the behavior of CD actuators, output CD actuator positions for the process model object 224, and output CD positions, mode, and status for the CD controls in the data source/destination 208. In addition, the process model object 224 may output an instantaneous profile of CD values, and the scanner simulator object 230 may generate multiple scanner measurement profiles for the supervisory MD and CD controls in the data source/destination 208 (such as a QCS).

Depending of the purpose of the simulation, the process simulator 202 can be set up differently. For example, the process simulator 202 could be set up with only a process model object 224, and a user could set the inputs to the process model object 224 through a simulation client 214. The user could then view the output from the process model object 224 at the simulation client 214. As another example, a user could set up the process simulator 202 with only a process model object 224 and a scanner simulator object 230. As in the previous example, the user could then manipulate the inputs to the process model object 224 through a simulation client 214. With the scanner simulator object 230, a data source/destination 208 (such as a QCS system) could be connected to the simulation server 212, and the user can observe the simulated process in the QCS.

As shown in FIG. 2C, each simulation server 212 can have one or multiple simulation clients 214 connected simultaneously. Each simulation client 214 may connect to a simulation server 212 either locally (such as on the same computer or other device) or remotely (such as via a network). This flexible architecture may, for example, facilitate use in a virtual classroom setting with an instructor and students in different physical locations. As a particular example, such flexibility may be achieved by designing components (such as the process model object 224 or the regulatory loop simulator object 222) in the simulation server 212 using an object-oriented programming language that supports distributable (stream-able) objects, such as C#/.Net. A simulation client 214 is therefore able to directly access the components in the simulation server 212 utilizing object streaming technology such as .Net Remoting.

Although FIGS. 2A through 2C illustrate one example of a system 200 for simulating a non-linear multivariable process, various changes may be made to FIGS. 2A through 2C. For example, the simulation server 212 and the simulation client 214 may not both reside on the process simulator 202. The simulation client 214 could connect to a simulation server 212 running on a separate device via a network or other interface. As a particular example, the simulation server 212 could be integrated into the data source/destination 208, and the simulation client 214 could access the simulation server 212 from any user's computing device. Also, various components shown in FIGS. 2A through 2C could be combined or omitted and additional components could be added according to particular needs. For instance, the disturbance generator object 226, the regulatory loop simulator object 222, and/or the scanner simulator object 230 could be omitted depending on the particular implementation of the process simulator 202. In addition, the process simulator 202 could retrieve data from and provide data to any suitable device or system, whether the process simulator 202 forms part of that device or system or communicates with the device or system in any suitable manner.

FIGS. 3A and 3B illustrate example multi-dimensional non-linear multivariable process models 300, 350 in accordance with this disclosure. The embodiments of the process models 300, 350 shown in FIGS. 3A and 3B are for illustration only. Other embodiments of the process models 300, 350 could be used without departing from the scope of this disclosure. Also, for ease of explanation, the process models 300, 350 are described as being used in the process simulator 202 of FIG. 2 to model the paper production system 100 of FIGS. 1A and 1B. The process models 300, 350 could be used with any other suitable device, system, or process.

The process models 300, 350 shown in FIGS. 3A and 3B may be used to represent a multi-dimensional non-linear multivariable process. These process models 300, 350 can therefore be used with process simulators, such as the process simulator 202 of FIG. 2, having fast execution suitable for simulating continuous flat sheet or other processes. The process models 300, 350 can easily be scaled up or down, such as to handle conventional one-dimensional processes. Here, the process is described as a "multi-dimensional" process in that the process has a spatial component and a dynamic component.

In these embodiments, a model of a multi-dimensional non-linear multivariable process is constructed using simpler building blocks. One example building block is shown in FIG. 3A, which illustrates a model 300. In this example, the model 300 includes three inputs denoted $u_1$-$u_3$ and a single output denoted $y_1$. The model 300 therefore represents a multiple input, single output (MISO) model. If a single input is used in the model 300, the model 300 would represent a single input, single output (SISO) model.

For each input, the model 300 defines a linear continuous time transfer function $G_{ij}(z)$ 302. The transfer function 302 generates an output representing an internal state $x_{ij}$ associated with the $j^{th}$ input $u_j$ and the $i^{th}$ output $\tilde{y}_i$. The transfer function 302 therefore represents a SISO transfer function. In many instances, the linear continuous time transfer function 302 has been determined and is readily available for different operating points in a process. The outputs of the transfer functions 302 are denoted $x_{ij}$, each of which can be viewed as an internal state and each of which represents the dynamic contribution from a process input $u_j$ to a process output $\tilde{y}_i$.

The model 300 also defines a non-linear static map $f(x_{11}, x_{12}, x_{13})$ 304, which maps the process inputs $u_j$ ($j=1, \ldots, n$) onto the $i^{th}$ process output. As such, the non-linear static map 304 represents a MISO mapping function. The non-linear static map 304 can often be determined from first principles and/or steady-state data from different operating points throughout the range of the process' operation. For example, in many cases, the non-linear static map 304 is known by an industrial process engineer or can be easily be attained using historical process data.

In addition, the model 300 defines a linear transfer function $H_i(z)$ 306, which produces the final process output $y_i$. As a result, the linear transfer function 306 represents a SISO transfer function. This completes the definition of the model 300.

The model 300 represents a building block that can be used to define larger and more complex processes. For example, each model 300 could have any suitable number of inputs. Also, the output of one model 300 could be used as an input to another model 300. The models 300 could be used in series or in parallel, and any arrangement of the models could be used to define larger and more complex processes.

One example use of the model 300 is shown in FIG. 3B, which illustrates a process model 350 of a 3×2 process (a process with three inputs and two outputs). Here, two models 300a-300b operate in parallel using the same three inputs to produce two outputs. This represents one very simple process model 350 that can be created using the model 300 as a building block. More complex processes can be represented using the appropriate combinations of models 300 or other building blocks.

As noted above, in many cases, the linear continuous time transfer functions 302, the non-linear static map 304, and the linear transfer function 306 are known or can be easily determined (such as by using historical data associated with a process). As a result, an approximate multi-dimensional non-linear multivariable model of a process can be defined and configured in a short period of time (compared with the time-consuming effort of deriving a set of coupled non-linear differential equations representing the process based on first principles). For example, in many cases, a process engineer or other personnel may know the linear dynamic and spatial relationship between process inputs and outputs (see Equation (1)) as well as the static non-linearities in the process (see Equation (2)):

$$\begin{bmatrix} y_1 \\ \vdots \\ y_m \end{bmatrix} = \begin{bmatrix} G_{11}(s) & \cdots & G_{1n}(s) \\ \vdots & \ddots & \vdots \\ G_{m1}(s) & \cdots & G_{mn}(s) \end{bmatrix} \begin{bmatrix} u_1 \\ \vdots \\ u_n \end{bmatrix} \quad (1)$$

$$\begin{bmatrix} y_1 \\ \vdots \\ y_m \end{bmatrix} = \begin{bmatrix} f_1(u_1, \ldots, u_n) \\ \vdots \\ f_m(u_1, \ldots, u_n) \end{bmatrix}. \quad (2)$$

This information can be used to quickly define the process model.

The process simulator 202 allows for quick and easy definition and simulation of a process based on this available knowledge. The simulation structure also allows for very efficient execution, making it suitable for evaluation of real-time industrial controllers. In particular embodiments, to facilitate the spatial aspect of process simulation, each process input and process output is array-based, and each transfer function contains a spatial mapping matrix:

$$G_{ij}(s) = K_{ij} \frac{a_n s^n + a_{n-1} s^{n-1} \cdots a_0}{b_m s^n + b_{m-1} s^{m-1} \cdots b_0} e^{-sT} \quad (3)$$

$$\bar{y}_i = G_{ij}(s) \bar{u}_j. \quad (4)$$

Here, $K_{ij}$ represents an m×n spatial mapping matrix, and the bar notation for y and u is used to emphasize that they are one-dimensional arrays.

Using models such as the model 300 in FIG. 3A, more complex processes can be defined by a user. As a result, a real process system, such as the paper production system 100, can be reduced to a non-linear multi-dimensional multivariable process model in a relatively short amount of time (compared to many conventional techniques). This allows the process model to be developed more quickly. Also, because the process model represents a process using transfer functions and mappings, the process model can be used relatively quickly during simulations to estimate how the process behaves. As a result, the speed of process simulations can be increased, allowing the process to be simulated in real-time (or at least faster than many conventional techniques).

Although FIGS. 3A and 3B illustrate examples of multi-dimensional non-linear multivariable process models, various changes may be made to FIGS. 3A and 3B. For example, the models shown in FIGS. 3A and 3B are examples only. Other simpler or more complex types of models could be used as building blocks to define larger or more complex processes. Also, any other larger or more complex processes can be modeled in the process simulator 202.

Figure 4:
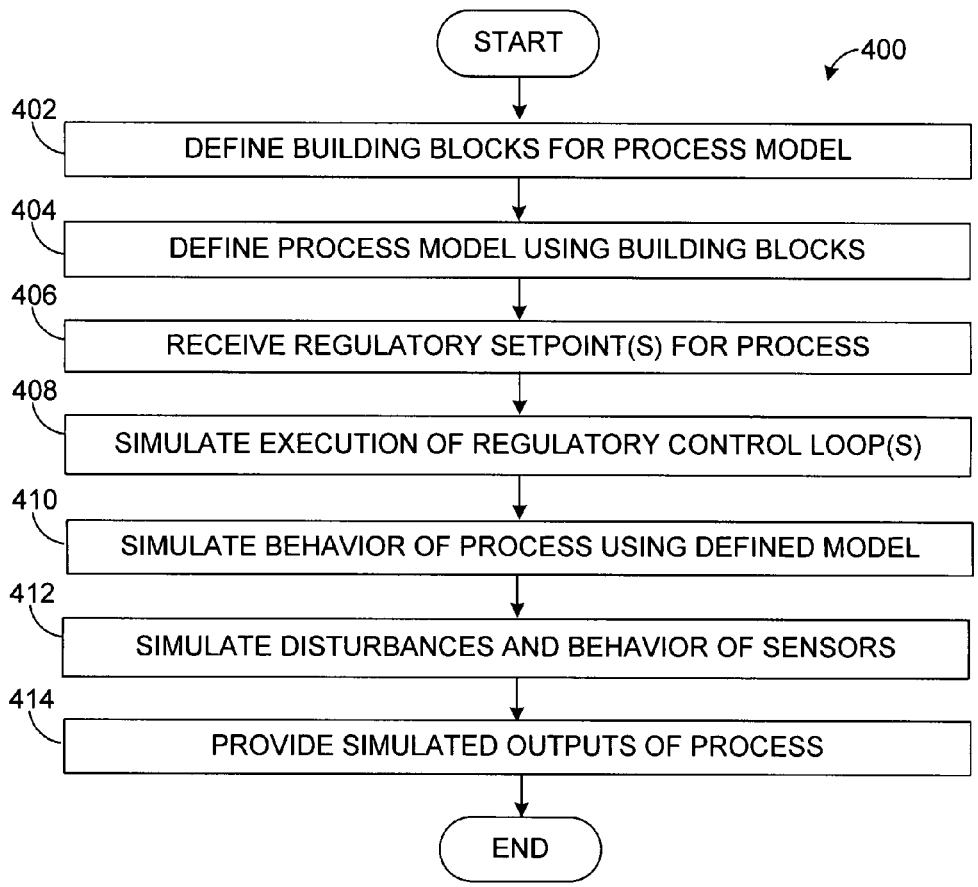
FIG. 4 illustrates an example method for simulating a multi-dimensional non-linear multivariable process in accordance with this disclosure.

FIG. 4 illustrates an example method 400 for simulating a multi-dimensional non-linear multivariable process in accordance with this disclosure. The embodiment of the method 400 shown in FIG. 4 is for illustration only. Other embodiments of the method 400 could be used without departing from the scope of this disclosure. Also, for ease of explanation, the method 400 is described as being used by the process simulator 202 of FIG. 2 to model the paper production system 100 of FIGS. 1A and 1B. The method 400 could be used with any other suitable device, system, or process.

One or more building blocks for process models are defined at step 402. This could include, for example, defining SISO or MISO model structures, which can then be combined to represent larger or more complex processes. In some embodiments, the process simulator 202 could have one or more standard building blocks, and a user could be allowed to create other building blocks.

A process model is defined using the building blocks at step 404. This could include, for example, a user using the simulation client 214 to define a larger or more complex process using one or more of the defined building blocks. The building blocks could be placed in series and/or in parallel to define the larger or more complex process. Also, during this step, the user could rely on knowledge or information from process engineers or other personnel to define the linear continuous time transfer functions 302, the non-linear static maps 304, and the linear transfer functions 306 in the building blocks.

One or more regulatory loop setpoints are received at step 406. This could include, for example, receiving the setpoints from an external or other data source, such as from a DA VINCI application server associated with a paper machine or from a user of the process simulator 202. In these embodiments, the process simulator 202 could form part of or reside external to the DA VINCI application server or other data source.

Execution of one or more regulatory control loops is simulated at step 408. This could include, for example, the regulatory loop simulator object 222 simulating how one or more process controllers would react to the received regulatory loop setpoints. As a particular example, this could include the regulatory loop simulator object 222 simulating the control signals that might be generated by the controller 122, the stock flow controller 124, or the steam pressure controller 128 in response to the regulatory loop setpoints. These simulated control signals would typically represent regulatory process variables, such as stock flow or steam pressure.

The behavior of the process is simulated using the defined process model at step 410. This could include, for example, providing the simulated control signals identified during the previous step to the process model object 224. This could also include using the process model object 224 to determine how, in real life, one or more controlled variables would be affected by the adjustments to the manipulated variables.

Disturbances and the behavior of sensors are simulated at step 412. This could include, for example, the disturbance generator object 226 simulating noise or other disturbances in the output of the process model object 224. This could also include the scanner simulator object 230 simulating the behavior of one or more scanners 120.

The simulated outputs of the process are provided to a destination at step 414. This could include, for example, providing a measurement profile containing a set of simulated controlled variable measurements. The simulated outputs could be provided to any suitable destination, such as an internal memory, a DA VINCI application server, a simulation client 214, or any other destination. Moreover, the simulated outputs could be used for any suitable purpose, such as to verify that a proposed change to one or more manipulated variables results in a desired change to one or more controlled variables.

Although FIG. 4 illustrates one example of a method 400 for simulating a multi-dimensional non-linear multivariable process, various changes may be made to FIG. 4. For example, some steps (such as step 412) could be omitted from the method 400.

The following represents additional details regarding one specific implementation of the process simulator 202. These details are provided only to describe a specific implementation of the process simulator 202. Other embodiments of the process simulator 202 could be used without departing from the scope of this disclosure.

In this example embodiment, the process simulator 202 is used to model the paper production system 100. The process simulator 202 here simulates various aspects of the system 100. This includes simulation of a multivariable spatial process, a multivariable temporal process, and sampling effects of the scanner 120. This also includes simulation of non-linearities in the process, which allows the process simulator 202 to be used for validation of product grade changes. This further includes simulation of low-level controllers (such as controllers 124 and 128), MD actuators, and CD actuators. In addition, this includes simulation of static and dynamic MD and CD disturbances. Moreover, the process simulator 202 in this embodiment can be automatically configured (such as by using QCS configuration files). The process simulator 202 can further be executed on the QCS server or a standalone device communicating with the QCS server over a network. In addition, the process simulator 202 may execute in a fraction of the real process' sample time (such as a real process sample time of 5-15 seconds).

Definition of LTI SISO Models

In these embodiments, the entire multi-dimensional non-linear multivariable process can be constructed using simpler building blocks. The building blocks could include linear time invariant (LTI) SISO models or more complex MISO models. The LTI SISO models may map an input profile (such as an actuator profile) to an output profile (such as a scanner measurement profile). The LTI SISO models can be externally represented using continuous time transfer functions with time delay, which can be expressed as:

$$G(s) = \frac{a_n s^n + a_{n-1} s^{n-1} \ldots a_0}{b_m s^n + b_{m-1} s^{m-1} \ldots b_0} e^{-sT}, \quad (5)$$

where m>n may be required for proper systems. The meaning of "externally represented" is that a user may define the dynamic behavior of the model by the coefficients in the transfer function. The transfer function is converted internally by the process simulator 202 into a discrete time transfer function and then to a discrete time state-space representation. The continuous time transfer function describes the relationship between the input and the output in the Laplace domain, which can be expressed as:

$$Y(s) = G(s)U(s), \quad (6)$$

where Y(s) and U(s) are the Laplace transforms of the output and input signals y(t) and u(t), respectively. Since this is used in the context of a SISO system, $y(t), u(t) \in \Re$.

The system defined in Equation (6) can be converted into a state-space representation, such as:

$$\begin{cases} \frac{dx}{dt} = Ax + Bu \\ y = Cx + Du. \end{cases} \quad (7)$$

In order to map an input profile (such as a CD actuator profile) to an output profile (such as a scanner measurement profile), this system can be expanded into a system with the corresponding number of inputs and outputs. As a result, the SISO system is effectively converted into a MIMO system.

Figure 5:
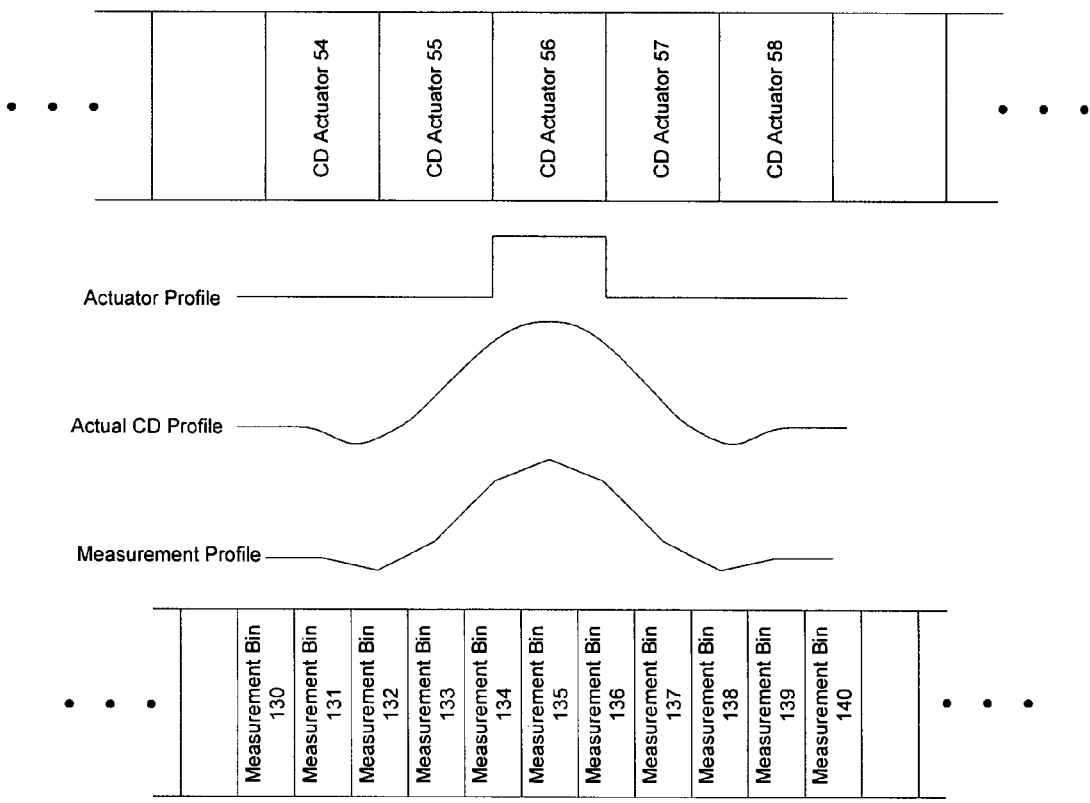
FIGS. 5 through 12 illustrate a specific simulation of a paper production system in accordance with this disclosure.

A spatial response matrix can be defined for this system as follows. Let $\bar{u}(t)$ represent the input profile to the process model from a CD actuator beam. The size of $\bar{u}(t)$ represents the number of zones in the CD actuator. Let $\bar{y}(t)$ represent the output CD profile from the process model. The size of $\bar{y}(t)$ represents the number of measurement bins for the simulated system. In this case, the spatial response matrix is the matrix representation of the mapping of $\bar{u}(t)$ onto $\bar{y}(t)$, which can be expressed as:

$$\bar{y}(t) = G\bar{u}(t), \quad (8)$$

where $\bar{y}(t)$ is n×1, $\bar{u}(t)$ is m×1, and G is n×m. One element in the input vector (one actuator) may generally affect a small adjacent collection of output elements (measurement bins). Because of this, G is generally sparse with all non-zero elements near the diagonal. FIG. 5 illustrates an example of this input to output mapping. In FIG. 5, a single actuator (CD Actuator 56) is activated as indicated by the actuator profile. The actual CD profile shows that this single actuator affects its zone and several adjacent zones. The measurement profile simulates the actual measurements taken by a scanner during different periods of time (referred to as measurement bins).

Figure 6:
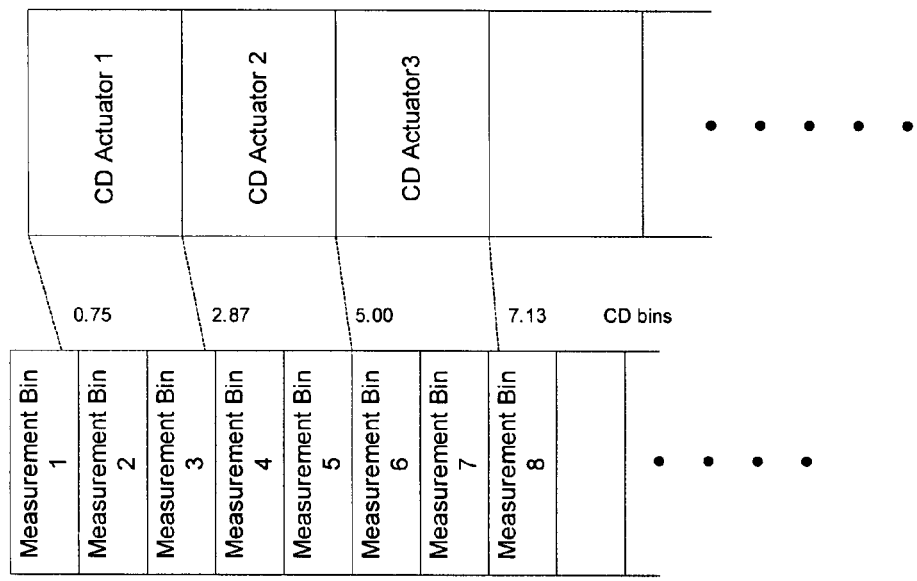

The spatial relationship between the CD actuator beam and the measurement bin profile may be needed to set up the mapping from the CD actuator beam to the measurement bin profile. This spatial relationship may depend on the physical spatial relationship between a CD actuator beam and the scanner 120. It may also depend on how the sheet 104 wanders between the CD actuator beam and the scanner 120, as well as any shrinkage (linear or non-linear) of the sheet 104. A "zone boundary array" identifies the measurement bin number (including fractions of measurement bins) to which each edge of a CD actuator corresponds. In this case, the zone boundary array may have a size equal to the number of actuators plus one. This is illustrated in FIG. 6, which shows how each of the edges of each actuator can be associated with a measurement bin (or portion thereof). In this example, the four first elements of the zone boundary array would be: Z={0.75, 2.87, 5.00, 7.13, ...}.

The spatial response matrix can then be derived using this information. Two factors may need to be taken into account when the spatial response matrix is calculated. One is the spatial relationship between the CD actuator beam and the measurement bins. As discussed above, the zone boundary array gives this relationship. Another is how an output from one actuator physically diverges in the CD direction, which was illustrated in FIG. 5. The relationship between one element in the output vector and all the elements in the input vector may be given by Equations (9)-(11):

$$\theta_{i,j}^- = \frac{i - Z_j - d_j - w_j}{w_j} \quad (9)$$

$$\theta_{i,j}^+ = \frac{i - Z_j + d_j - w_j}{w_j} \quad (10)$$

$$G_{i,j} = \frac{g_j}{2}\left(e^{-a_j \theta_{i,j}^-} \cos(\pi \theta_{i,j}^-) + e^{-a_j \theta_{i,j}^+} \cos(\pi \theta_{i,j}^+)\right) \quad (11)$$

$$i = 1, \ldots, n$$
$$j = 1, \ldots, m.$$

Here, g represents the gain vector, w represents the width vector, d represents the divergence vector, a represents the attenuation array, and Z represents the zone boundary array.

Once determined, the spatial response matrix can be used to expand the SISO model. For example, when the spatial relationship between the actuators and the measurement bins and the divergence are known, the SISO model can be expanded from a system with one input and one output to a system with the same number of inputs as the number of actuators and the same number of outputs as the number of measurement bins. This can be done by expanding the state-space representation of the system (Equation (7)) with the number of states in the original system times the number of measurement bins. For a SISO systems with two states in the state-space representation and with the matrices:

$$\tilde{A} = \begin{bmatrix} a_{11} & a_{12} \\ a_{21} & a_{22} \end{bmatrix} \quad \tilde{B} = \begin{bmatrix} b_1 \\ b_2 \end{bmatrix} \quad (12)$$
$$\tilde{C} = [c_1 \; c_2] \quad \tilde{D} = [d],$$

and with a spatial response matrix G, the expanded matrices can be expressed as:

$$A = \begin{bmatrix} a_{11}I_n & a_{12}I_n \\ a_{21}I_n & a_{22}I_n \end{bmatrix} \quad B = \begin{bmatrix} b_1 G_{11} & \cdots & b_1 G_{m1} \\ \vdots & \ddots & \vdots \\ b_1 G_{1n} & \cdots & b_1 G_{mn} \\ b_2 G_{11} & \cdots & b_2 G_{m1} \\ \vdots & \ddots & \vdots \\ b_2 G_{1n} & \cdots & b_2 G_{mn} \end{bmatrix} \quad (13)$$

$$C = \begin{bmatrix} c_1 & & & c_2 & & \\ & \ddots & & & \ddots & \\ & & c_1 & & & c_2 \end{bmatrix} \quad D = [d \cdot G].$$

Here, A is 2n×2n, B is 2n×m, C is n×2m, and D is n×m, where m represents the number of inputs (CD actuators) and n represents the number of outputs (measurement bins). Also, $I_n$ represents an n×n identity matrix. In the general case where p represents the number of states in the state-space representation of the SISO system, A is pn×pn, B is pn×m, C is n×pm, and D is n×m.

The state-space representation of the system can then be converted from continuous to discrete form. The system may then have a discrete state-space representation, such as:

$$\begin{cases} x(k+1) &= A_d x(k) + B_d u(k) \\ y(k) &= C_d x(k) + D_d u(k). \end{cases} \quad (14)$$

Here, $A_d$, $B_d$, $C_d$ and $D_d$ represent the discrete time representations of the continuous time matrices A, B, C and D. Before the start of simulation, the discrete state-space vector x may be initialized with a "time-zero" input to the system. If the simulation starts at k=0, a value of x(0) can be derived given u(0) and the state-space matrices. It is assumed that the system is in steady state for k<0, meaning:

$$\begin{cases} x(k+1) = x(k) \\ u(k+1) = u(k) \end{cases} \forall k < 0, k \in Z. \quad (15)$$

In this case, x(0) can be determined as:

$$x(0) = A_d x(0) + B_d u(0) \Rightarrow x(0) = (I - A_d)^{-1} B_d u(0). \quad (16)$$

To summarize, the dynamic relationship between one input and one output can be given by the coefficients in a continuous time transfer function (as shown in Equation (5)). This transfer function can be converted to a discrete time transfer function and then to a state-space representation of the system. The relationship, or mapping, between a CD actuator beam and a measurement scanner (measurement bin profile) is given by the spatial response matrix G. Given a gain vector g, a width vector w, a divergence vector d, an attenuation array a, and a zone boundary array Z, the spatial response matrix can be calculated using Equations (9)-(11). Once the spatial response matrix is calculated, the original SISO model can be expanded with the CD actuator-to-measurement bin relationship. This is done by building matrices for a new state-space representation, where the elements in the SISO state-space representation are used.

Creation of MIMO Model Using SISO Models

Once the SISO models are defined, larger MIMO models representing more complex aspects of the paper production system 100 can be defined. A physical entity in a modeled process may normally be approximated as a combination of the outputs from two or more SISO models. For example, the dry weight of a sheet 104 could be modeled as the combination of the outputs from a "Stock Flow to Dry Weight" SISO model and a "Machine Speed to Dry Weight" SISO model. The combined set of SISO models is a MIMO model if there is more than one unique output and more than one unique input. The combined set of SISO models is a MISO model if the SISO models share the same unique output. The output of the MISO model can represent a linear or non-linear combination of the outputs from the SISO models in the MISO model.

In some cases, it may be necessary for the outputs from one or more SISO models in a MIMO model to have a "delta" output form, while other SISO models have a "normal" or "absolute" output form. The "normal" or "absolute" implementation of a discrete state-space function can be given by:

$$\begin{cases} x(n+1) &= Ax(n) + Bu(n) \\ y(n) &= Cx(n) + Du(n) \end{cases}, n \in Z^+. \quad (17)$$

For a SISO model on the "delta" output form, the output from that SISO model is the difference between its output y at current and previous steps n:

$$\begin{cases} x(n+1) &= Ax(n) + Bu(n) \\ y(n) &= Cx(n) + Du(n), n \in Z^+, \\ \Delta y(n) &= y(n) - y(n-1) \end{cases} \quad (18)$$

where Δy represents the output from the SISO model. By introducing Δx(n)=x(n)−x(n−1) and Δu(n)=u(n)−u(n−1), Equation (18) could be rewritten in a more compact form similar to Equation (17). However, from a practical standpoint, it may be more convenient to implement Equation (18) in the process simulator 202 since this requires only one implementation. A user can then choose to use y or Δy. The user can also specify the initial output y(0) from the SISO model at the initialization of the model.

The ability to allow SISO models in a MIMO model to use a "delta" output form or an "absolute" output form may provide increased flexibility when the MIMO model represents a non-linear process. The output from a non-linear model may use an absolute form. In a mathematical sense, this means that the non-linear model is a first-order approximation for a modeled process. As a result, any other extra approximation for that same process may not be a first-order approximation. As a particular example, in a MISO model for the moisture content of the sheet 104 at the reel 106, the moisture at the reel 106 could be modeled by a non-linear moisture/dryer model that is a first-order approximation (the output from that model is an "absolute" moisture level). If this MISO model also contains a SISO model for a Devronizer's impact on the moisture at the reel 106, this SISO model may be a second-order approximation. The SISO model for the Devronizer may not model the absolute moisture level at the reel 106, but rather the "difference" the Devronizer makes by "adding" or "subtracting" the output from that SISO model from the absolute moisture level calculated by the non-linear moisture/dryer model.

Non-Linear Moisture/Dryer Model

A non-linear moisture/dryer model can be defined and used to accurately model the MD moisture content in the sheet 104 at any location in the dryer section 114 of the paper machine 102. The inputs to this model may be known parameters, such as steam pressure, moisture content of the sheet 104 going into the dryer section 114, and the dry weight of the sheet 104.

The values in Table 1 are used in the following discussions.

TABLE 1

| Parameter | Description | Unit |
|---|---|---|
| $\alpha_{cp} = \alpha_{cp}(u(x))$ | Variable. Heat transfer coefficient from a dryer cylinder to the sheet 104. | $J/(s \cdot K\, m^2)$ |
| $\alpha_{sc}$ | Constant. Heat transfer coefficient from steam to a dryer cylinder. | $J/(s \cdot K\, m^2)$ |
| $\rho_c$ | Constant. Density of a cylinder shell. | $kg/(m^3)$ |
| $C_c$ | Constant. Specific heat capacity of a cylinder shell. | $J/(kg \cdot K)$ |
| $C_{p,fiber}$ | Constant. Specific heat capacity of paper fibers. | $J/(kg \cdot K)$ |
| $C_{p,p} = C_{p,p}(u(x))$ | Variable. Specific heat capacity of paper pulp. | $J/(kg \cdot K)$ |
| $C_{p,w}$ | Constant. Specific heat capacity of water. | $J/(kg \cdot K)$ |
| $d_{cz}$ | Constant. Thickness of a cylinder shell. | m |
| $d_y$ | Constant. Width of a sheet 104. | m |
| g | Constant. Dry weight of a sheet 104. | $kg/m^2$ |
| $H_{vap}$ | Constant. Latent heat of vaporization. | J/kg |
| $H_s = H_s(u(x), T_p(x))$ | Variable. Heat of sorption. | J/kg |
| K | Constant. Mass transfer coefficient from a sheet 104. | m/s |
| $m_s = m_s(t)$ | Variable. Mass of solids in a sheet 104 (within the system). | kg |
| $m_w = m_w(t)$ | Variable. Mass of water in a sheet 104 (within the system). | kg |
| $M_w$ | Constant. Molecular weight of water. | kg/mole |
| $p_s$ | Constant. Absolute steam pressure. | Pa |
| $p_{tot}$ | Constant. Total air pressure. | Pa |
| $p_{v,a} = p_{v,a}(r)$ | Constant (derived). Partial vapor pressure for water vapor in air. | Pa |
| $p_{v,p} = p_{v,p}(u(x))$ | Variable. Partial vapor pressure at sheet surface. | Pa |
| $p_{v0} = p_{v0}(T_p(x))$ | Variable. Partial vapor pressure for free water. | Pa |
| $q_e = q_e(u(x), T_p(x))$ | Variable. Evaporation rate from a sheet 104. | $kg/(m^2 \cdot s)$ |
| $\dot{Q}_{cp} = \dot{Q}_{cp}(u(x), T_p(x), T_c(x))$ | Variable. Heat flow from a cylinder shell to a sheet 104. | $J/(m^2 \cdot s)$ |
| $\dot{Q}_e = \dot{Q}_e(u(x), T_p(x))$ | Variable. Heat flow rate per unit area due to water evaporation. | $J/(m^2 \cdot s)$ |
| $\dot{Q}_{sc} = \dot{Q}_{sc}(T_c(x), T_s)$ | Variable. Heat flow rate from steam to a cylinder shell. | $J/(m^2 \cdot s)$ |
| r | Constant. Moisture content of air. | kg water vapor/kg dry air |
| $R_g$ | Constant. Gas constant. | $J/mole \cdot K$ |
| $T_c = T_c(x)$ | Variable. Cylinder shell temperature. | K |
| $T_p = T_p(x)$ | Variable. Sheet temperature. | K |
| $T_s = T_s(p_s)$ | Constant (derived). Temperature of steam in the cylinders. | K |
| u = u(x) | Variable. Moisture ratio. | kg water/kg solids |
| $v_x$ | Constant. Sheet (machine) speed. | m/s |

The differential equations describing the moisture content in the sheet 104, as well as the differential equations for the sheet temperature and the dryer cylinder shell temperatures, may be derived as follows. These differential equations may describe the static relationship between the input signals to the model and the outputs of the model. The differential equations can be derived from mass and heat balance equations for a system. A system in this case can be any defined limited part of the sheet 104 in the paper machine 102 to be modeled, such as the sheet 104 in one dryer section or the sheet 104 around one dryer cylinder. A set of differential equations can be formulated to model this system. In some embodiments, this set of differential equations is a function of space (position in the dryer section 114).

Figure 7:
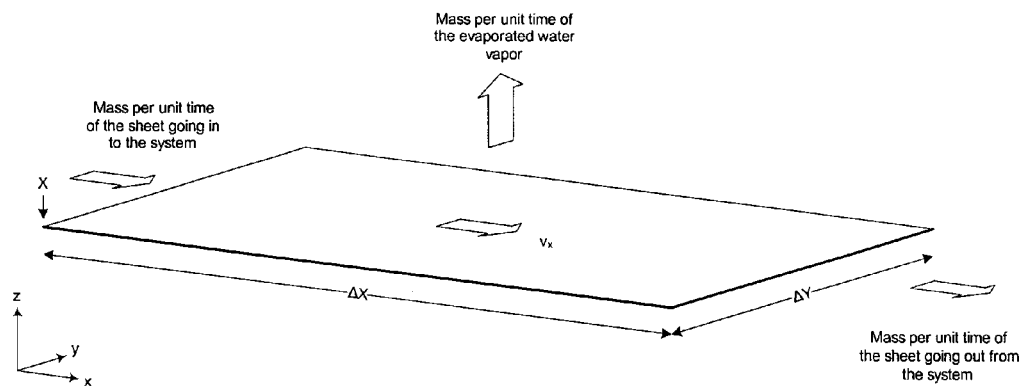

At steady state, the amount of mass that goes into a system equals the amount of mass coming out of the system. One way to formulate this is to say that the mass per unit time (the mass flow) going into the system equals the mass flow per unit time going out of the system. The "system" used here is an area element of the sheet 104 in a paper machine's dryer section 114. The mass balance of an area unit of the sheet 104 is shown in FIG. 7. At steady state, the mass flow of the sheet 104 going into the dryer section 114 at x equals the mass flow of the sheet 104 going out of the system at point x+Δx, minus the mass of water evaporated in the system. The mathematical formulation of the mass balance for water in the sheet 104 can be given as:

$$\dot{m}_w(x + \Delta x) = \dot{m}_w(x) - \dot{m}_e \quad \left[\frac{kg}{s}\right], \tag{19}$$

where $\dot{m}_e$ represents the mass of the evaporated water per unit time in the system [kg/s], $\dot{m}_w(x)$ represents the mass per unit time of water in the sheet 104 transported into the system [kg/s], and $\dot{m}_w(x+\Delta x)$ represents the mass per unit time of water in the sheet 104 transported out from the system [kg/s].

The moisture ratio u represents the unit mass of water in the sheet 104 per unit mass of the solids in the sheet 104. An alternative expression for the mass flow of water can therefore be derived from the definition of u. The moisture ratio can be defined as:

$$u = \frac{m_w}{m_s} \Rightarrow m_w = m_s u \Rightarrow \frac{d}{dt} m_w = \dot{m}_w = \dot{m}_s u + m_s \dot{u}, \quad (20)$$

where u represents the moisture ratio [kg water/kg solids], $m_w$ represents the mass of water in the sheet 104 [kg], and $m_s$ represents the mass of solids in the sheet 104 [kg]. It is assumed here that there is no loss or gain of solids in the system being modeled, so $\dot{m}_s$ is constant throughout the system ($\dot{m}_s(x)=\dot{m}_s(x+\Delta x)$ for any $\Delta x$ in the system). As a result, the only mass loss is due to evaporation of water from the sheet 104. Also, the moisture ratio may be constant with respect to time at steady-state ($\dot{u}=0$).

The mass of solids in the sheet 104 may be determined as the dry weight times the area of the sheet 104. This can be expressed as:

$$m_s = g d_y x \, [\text{kg}], \quad (21)$$

where $m_s$ represents the mass of solids in the sheet 104 [kg], g represents the dry weight [kg/m²], $d_y$ represents the width of the sheet 104 [m], and x represents the length of the sheet 104 [m]. Taking the time derivative yields an expression for the mass flow of solids per unit time per unit area $\dot{m}_s$. This can be represented as:

$$\frac{d}{dt} m_s \equiv \dot{m}_s = g d_y \dot{x} = g d_y v_x \left[\frac{\text{kg}}{\text{s}}\right]. \quad (22)$$

where $\dot{x} \equiv v_x$ represents the sheet (machine) speed [m/s]. Substituting this expression for $\dot{m}_s$ in Equation (20) and the resulting expression for $\dot{m}_w$ into Equation (19) yields:

$$g d_y v_x u(x+\Delta x) = g d_y v_x u(x) - \dot{m}_e. \quad (23)$$

Rearrangement of this equation gives:

$$u(x+\Delta x) - u(x) = -\frac{1}{g d_y v_x} \dot{m}_e. \quad (24)$$

The evaporation rate $q_e$ per unit area per unit time can be derived as shown below. The evaporation rate identifies the mass of water evaporating from the sheet 104 per unit area per unit time as a function of the sheet temperature and the moisture ratio ($q_e = q_e(u(x), T_p(x))$). Integrating over the surface of the sheet 104 in the system gives the total mass flow per unit time [kg/s]:

$$\dot{m}_e = \int_A q_e \, dA. \quad (25)$$

The evaporation rate $q_e$ may be constant over the sheet's width ($d_y$), so this can be rewritten as:

$$\dot{m}_e = d_y \int_x^{x+\Delta x} q_e(u(\xi), T_p(\xi)) d\xi. \quad (26)$$

Substituting Equation (26) into Equation (24) yields:

$$u(x+\Delta x) - u(x) = -\frac{1}{g d_y v_x} d_y \int_x^{x+\Delta x} q_e(u(\xi), T_p(\xi)) d\xi. \quad (27)$$

Using the derivative definition gives, after eliminating $d_y$, the following:

$$\frac{du}{dx} = \lim_{\Delta x \to 0} \frac{u(x+\Delta x) - u(x)}{\Delta x} = \lim_{\Delta x \to 0} \frac{-\frac{1}{g v_x} \int_x^{x+\Delta x} q_e(u(\xi), T_p(\xi)) d\xi}{\Delta x} = -\frac{1}{g v_x} q_e(u(x), T_p(x)). \quad (28)$$

This represents the differential equation for the moisture ratio in the sheet 104 as a function of the sheet temperature and the sheet's position in the paper machine 102.

Heat flow balances can also be determined for the sheet 104, such as the heat flow from the steam to the cylinder shells in the dryer section 114. The solution to Equation (28) describes the moisture ratio as a function of x and uses the sheet temperature $T_p$ as an input. A set of heat flow balance equations can be used to model the heat flow from the steam into the dryer cylinders, through the cylinders, and into the sheet 104. The sheet temperature can then be calculated from this heat balance.

The heat flow per unit time per unit area from the steam to a cylinder shell can be given by:

$$\dot{Q}_{sc}(x) = \alpha_{sc}(T_s - T_c(x)) \left[\frac{\text{J}}{\text{m}^2 \text{s}}\right], \quad (29)$$

where $\alpha_{sc}$ represents the heat transfer coefficient from the steam to the cylinder shell [J/(Km²s)], $T_s$ represents the steam temperature [K], and $T_c$ represents the cylinder shell temperature [K]. The heat flow per unit time from the cylinder shell to the sheet 104 can be given by:

$$\dot{Q}_{cp}(x) = \alpha_{cp}(u(x))(T_c(x) - T_p(x)) \left[\frac{\text{J}}{\text{m}^2 \text{s}}\right], \quad (30)$$

where $\alpha_{cp}$ represents the heat transfer coefficient from the cylinder shell to the sheet 104 [J/(Km²s)], and $T_p$ represents the sheet temperature.

If W represents the heat in one surface element of the cylinder shell, this element can be fixed in space (and not moving along as the cylinder rotates). The latent heat stored in that surface element can be given by:

$$W_c(x, t) = \rho_c d_{cz} C_c T_c(x, t) \left[\frac{\text{J}}{\text{m}^2}\right]. \quad (31)$$

Here, $\rho_c$ represents the density of the cylinder shell (such as the density of cast iron) [kg/m³], $d_{cz}$ represents the thickness of the cylinder shell [m], and $C_c$ represents the specific heat capacity of the cylinder shell [J/(kg·K)]. Even though heat flow due to heat transportation in the xy-plane on the cylinder shell is not considered in this model, there may be a flux of heat into the surface element in the x-direction due to the cylinder moving in the x-direction (the cylinder surface element is fixed in space). This flux can be given by taking the derivative with respect to x in Equation (31), which gives:

$$\frac{d}{dx}W_c(x) = \rho_c d_{cz} C_c \frac{d}{dx}T_c(x) \quad \left[\frac{J}{m^3}\right]. \tag{32}$$

The time variable t is omitted since the system is assumed to be in steady-state. Multiplying this expression by the peripheral speed of the dryer cylinder shell (the sheet speed) may yield the heat flux due to the movement of the dryer cylinder, which can be expressed as:

$$v_x \frac{dW_c(x)}{dx} = \rho_c d_{cz} C_c v_x \frac{dT_c(x)}{dx} \quad \left[\frac{J}{m^2 s}\right]. \tag{33}$$

The steady-state heat flow balance for the latent heat in a surface element of the cylinder shell can then be given by:

$$\underbrace{v_x \frac{dW_c(x)}{dx}}_{Source} + \underbrace{\dot{Q}_{sc}(x)}_{Source} - \underbrace{\dot{Q}_{cp}(x)}_{Sink} = 0 \quad \left[\frac{J}{m^2 s}\right]. \tag{34}$$

After rearrangement with the left hand side of Equation (33) substituted, the following can be obtained:

$$\frac{dT_c(x)}{dx} = \frac{1}{\rho_c d_z C_c v_x}\left(\dot{Q}_{cp}(x) - \dot{Q}_{sc}(x)\right) \quad \left[\frac{K}{m}\right]. \tag{35}$$

The solution to these differential equations describes the cylinder shell temperature on one cylinder as a function of the position on the cylinder.

The expression for the heat flow from the cylinder shell to the sheet 104 per unit area can be given as:

$$\dot{Q}_{cp}(x) = \alpha_{cp}(x)(T_c(x) - T_p(x)) \quad \left[\frac{J}{m^2 s}\right], \tag{36}$$

where $\alpha_{cp}$ represents the heat transfer coefficient from the cylinder shell to the sheet 104 [J/(Km²s)], $T_c$ represents the cylinder shell temperature [K], and $T_p$ represents the sheet temperature [K]. The heat flux through one fixed element of the sheet 104 due to movement of the sheet 104 through the machine 102 can be given as:

$$v_x \frac{dW_p(x)}{dx} = gC_{p,p}v_x \frac{dT_p(x)}{dx} \quad \left[\frac{J}{m^2 s}\right], \tag{37}$$

where g represents the dry weight of the sheet 104 [kg/m²], and $C_{p,p}$ represents the specific heat capacity of the sheet 104.

The heat transport from the sheet 104 considered in this model could include the heat carried in the moisture vaporizing from the sheet 104, which is denoted $\dot{Q}_{evap}$. The heat balance equation for one surface element of the sheet 104 can be expressed as:

$$\underbrace{v_x \frac{dW_p(x)}{dx}}_{Source} + \underbrace{\dot{Q}_{cp}(x)}_{Source} - \underbrace{\dot{Q}_{evap}(x)}_{Sink} = 0 \quad \left[\frac{J}{m^2 s}\right], \tag{38}$$

which can be rewritten as:

$$\frac{dT_p(x)}{dx} = \frac{1}{gC_{p,p}v_x}\left(\dot{Q}_{evap}(x) - \dot{Q}_{cp}(x)\right) \quad \left[\frac{K}{m}\right]. \tag{39}$$

To summarize, a set of differential equations describing the moisture ratio in the sheet 104, the cylinder shell temperature, and the sheet temperature are given by Equations (28), (35), and (39), respectively. These can be expressed in a more explicit form as:

$$\frac{du}{dx} = -\frac{1}{gv_x}q_e(u(x), T_p(x)) \tag{40}$$

$$\frac{dT_c(x)}{dx} = \frac{1}{\rho_c d_z C_c v_x}\left(\dot{Q}_{cp}(u(x), T_c(x), T_p(x)) - \dot{Q}_{sc}(T_c(x))\right)$$

$$\frac{dT_p(x)}{dx} = \frac{1}{gC_{p,p}(u(x))v_x}\left(\dot{Q}_{evap}(u(x), T_p(x)) - \dot{Q}_{cp}(u(x), T_c(x), T_p(x))\right).$$

Description of Calculations

The moisture ratio u can be defined as:

$$u = \frac{m_{water}}{m_{solids}}, \tag{41}$$

where $m_{water}$ represents the mass of water in the sheet 104 [kg], and $m_{solids}$ represents the mass of solids (such as fibers and additives) in the sheet 104.

If steam within a dryer cylinder cavity is homogenous with the same pressure and temperature and is saturated, the steam temperature is a function of the steam pressure only. Fitted polynomials to tabulated values for saturated steam are known. As an example, the steam temperature in a dryer cylinder could be given as:

$$T_s(p_s) = 0.1723(\ln p_s)^3 - 3.388(\ln p_s)^2 + 37.71 \ln p_s + 124.5, \tag{42}$$

where $T_s$ represents the steam temperature [K], and $p_s$ represents the absolute steam pressure [Pa].

The heat transfer coefficient $\alpha_{sc}$ from the steam to a cylinder shell may be dependent on many variables, such as condensate thickness, machine speed, and number of spoiler bars. The coefficient could, for example, vary from values less than 100 [W/(m²K)] to over 3,000 [W/(m²K)]. This heat transfer coefficient can therefore be used as a free variable to tune the model.

The heat transfer coefficient $\alpha_{cp}$ from a cylinder shell to the sheet 104 may also be heavily dependent of a number of factors. Some of the factors this coefficient depends upon may include sheet tension and surface smoothness of both the cylinder and the sheet 104. An empirical model based on a linear relation with the moisture ratio u can be given by:

$$\alpha_{cp}(u(x)) = \alpha_{cp}(0) + 955u(x) \left[\frac{J}{m^2 Ks}\right], \quad (43)$$

where $\alpha_{cp}(0)$ is used as a tuning parameter and could typically vary (such as between 200 and 500 [W/(m²K)]).

An expression for the evaporation rate $q_e$ [kg/(m²s)] of water from the surface of the sheet 104 per unit area per unit time can be expressed as:

$$q_e = \frac{p_{tot} K M_w}{R_g T_p} \ln\left(\frac{p_{tot} - p_{v,a}}{p_{tot} - p_{v,p}}\right) \left[\frac{kg}{m^2 s}\right], \quad (44)$$

where $p_{tot}$ represents the total air pressure in the dryer section 114 [Pa], K represents the mass transfer coefficient [m/s], $M_w$ represents the molecular weight of water [kg/mole], $R_g$ represents the gas constant [J/(mole·K)], and $T_p$ represents the sheet temperature [K]. The parameters $p_{v,a}$ and $p_{v,p}$ represent the partial vapor pressure for water in the air and the partial vapor pressure for water at the sheet surface [Pa].

The partial pressure for water vapor in the air can be given by the moisture content of air r [kg water vapor/kg dry air] and the total pressure, such as by:

$$p_{v,a} = \frac{r}{r + 0.62} p_{tot} \; [Pa]. \quad (45)$$

The partial vapor pressure at the sheet surface can be given by the expression:

$$p_{v,p} = \phi p_{v0} [Pa], \quad (46)$$

where $\phi$ represents the sorption isotherm, and $P_{v0}$ represents the partial vapor pressure for free water. The sorption isotherm compensates for the fact that the partial vapor pressure at the sheet surface decreases when the sheet gets dryer. For a relatively damp sheet 104, capillary forces can bring up water to the sheet surface and, in this case, the partial vapor pressure at the sheet surface is about the same as the partial vapor pressure for free water. An empirical expression for the sorption isotherm in paper pulp can be given as:

$$\phi = 1 - \exp(-47.58 u^{1.877} - 0.10085(T_p - 273) u^{1.0585}). \quad (47)$$

The partial vapor pressure for free water $p_{v0}$ can be expressed as:

$$p_{v0}(x) = 10^{\left(10.127 - \frac{1690}{T_p(x) - 43.15}\right)} \; [Pa]. \quad (48)$$

The specific heat capacity of paper pulp may be based on the moisture ratio and the heat capacity for paper fibers. This can be expressed as:

$$C_{p,p}(x) = \frac{C_{p,fiber} + u(x) C_{p,w}}{1 + u(x)} \left[\frac{J}{kg K}\right], \quad (49)$$

where $C_{p,p}$ represents the specific heat capacity of paper pulp [J/(kg·K)], $C_{p,fiber}$ represents the specific heat capacity of paper fibers [J/(kg·K)], $C_{p,w}$ represents the specific heat capacity of water [J/(kg·K)], and u represents the moisture ratio. As a particular example, $C_{p,fiber} = 1256$[J/(kg·K)].

The water vaporized from the sheet 104 contains heat that is carried away from the sheet 104. The heat needed to vaporize water is given by the latent heat of vaporization, $\Delta H$ [J/kg]. At low moisture ratios, water cannot be considered as a free water surface. An extra amount of energy is added to the energy needed to vaporize the water from the sheet 104, and this extra energy is called the heat of sorption. The total energy per unit mass to evaporate water from the sheet 104 can be given by:

$$\Delta H(x) = \Delta H_{vap} + \Delta H_s(x) \left[\frac{J}{kg}\right], \quad (50)$$

where $\Delta H_{vap}$ represents the latent heat of vaporization (2260 [kJ/kg] for water), and $\Delta H_s$ represents the heat of sorption. Multiplying this equation with the evaporation rate $q_{evap}$ from the sheet 104 may provide the heat flow from the sheet surface per unit area due to water vaporization, which can be expressed as:

$$\dot{Q}_{evap}(x) = q_e(x) \Delta H(x) = q_e(\Delta H_{vap} + \Delta H_s(x)) \left[\frac{J}{m^2 K}\right]. \quad (51)$$

The heat of sorption can be derived from the following expression:

$$\Delta H_s(x) = -\frac{R_g}{M_w}\left[\frac{d(\ln \varphi_s(x))}{d(1/T_{p_s}(x))}\right] \left[\frac{J}{kg}\right]. \quad (52)$$

Applying the empirical sorption isotherm for paper pulp, Equations (47)-(52) yield:

$$\Delta H_s = 0.10085 u^{1.0585} T_p^2 R_p \frac{\varphi - 1}{M_w \varphi} \left[\frac{J}{kg}\right]. \quad (53)$$

Non-Linear Dry Weight Model

A non-linear dry weight model can be defined and used to model the MD dry weight in the paper machine 102 based on known parameters such as stock flow, stock consistency, flow of additives (fillers), sheet width, and machine speed. The "dry weight" of a sheet 104 represents the weight of the sheet 104 per unit area with all water removed. This includes the weight of paper fibers and any additives remaining in the sheet 104.

The values in Table 2 are used in the following discussions.

TABLE 2

| Parameter | Description | Unit |
| --- | --- | --- |
| $c_a = c_a$ (t) | Variable. Filler consistency. | (kg solids/kg total) |
| $c_{stock} = c_{stock}$ (t) | Variable. Stock consistency. | (kg solids/kg total) |
| $d_y$ | Constant. Sheet width. | m |
| g | Variable. Dry weight. | kg/m³ |
| $l_{machine}$ | Constant. Physical length of a sheet 104 from the headbox 108 to the point being modeled. | m |

TABLE 2-continued

| Parameter | Description | Unit |
|---|---|---|
| $\dot{m}_{dry}$ | Variable. Dry stock mass flow. | kg/s |
| r | Constant. Retention factor. | |
| $v_x$ | Constant. Machine speed. | m/s |
| $q_a$ | Variable. Dry filler flow. | m³/min |
| $q_{a,tot}$ | Variable. Total (wet) filler flow. | m³/min |
| $q_f$ | Variable. Fiber flow (dry stock flow). | m³/min |
| $q_{tot}$ | Variable. Total (wet) stock flow. | m³/min |
| $\rho_a$ | Constant. Average density of fillers. | kg/m³ |
| $\rho_f$ | Constant. Density of paper fibers. | kg/m³ |
| $\rho_w$ | Constant. Density of water. | kg/m³ |

As noted above, stock is formed from three main components: paper fibers, water, and additives (fillers). The total stock flow $q_{total}$ can therefore be expressed as:

$$q_{total} = q_f + q_w + q_a \quad \left[\frac{m^3}{s}\right], \quad (54)$$

where $q_f$ represents the fiber flow, $q_w$ represents the water flow, and $q_a$ represents the filler flow (flow of additives) (all in [m³/s]). Equation (54) expresses the total stock flow. The value of this stock flow is dependent on where in the stock circulation it is measured. For example, with reference to FIG. 1B, the stock flow may be lower in the long circulation path 164 as compared to the short circulation path 160. Moreover, as noted above, the whole amount of fillers and fibers does not remain in the sheet 104. A fraction of the fillers and fibers remains in the water removed using the screen or mesh 110. A certain amount of the sheet 104 is also trimmed off. In order to take this into account in the model, a retention factor r is used in the model.

The fiber flow $q_f$ and the flow of additives $q_a$ may not be explicitly known for a paper machine 102. As a result, these values might not be used as inputs to a dry weight model. However, the stock consistency and the consistency of the fillers are often known. The stock consistency commonly used in the paper industry can be defined as:

$$c_{stock} = \frac{m_{solids}}{m_{total}}. \quad (55)$$

Here, $m_{solids}$ represents the mass of both fibers and fillers [kg], and $m_{total}$ represents the total mass of the fiber suspension [kg]. In this equation, $m_{solids}=m_f+m_a$ and $m_{total}=m_f+m_a+m_w$, where $m_f$ represents the mass of the fibers, $m_a$ represents the mass of the fillers, and $m_w$ represents the mass of the water. Taking the time derivative and substituting the result into Equation (55) may yield:

$$c_{stock} = \frac{\dot{m}_{solids}}{\dot{m}_{total}} = \frac{\rho_f q_f + \rho_a q_a}{\rho_f q_f + \rho_a q_a + \rho_w q_w}. \quad (56)$$

Here, $\rho_f$ represents the density of the fibers, $q_f$ represents the (dry) flow of fibers, $\rho_a$ represents the average density of the fillers, $q_a$ represents the filler flow, $\rho_w$ represents the density of water, and $q_w$ represents the flow of water. The densities may be in units of [kg/m³], and the flows may be in units of [m³/kg]. The total stock flow (normally measurable on a paper machine 102) can be introduced as $q_{tot}=q_f+q_a+q_w$ or $q_w=q_{tot}-q_f-q_a$. Substituting this expression into Equation (56) and solving for $q_f$ yields:

$$q_f = \frac{\rho_a q_a - c_{stock}(\rho_a q_a + \rho_w q_{tot} - \rho_w q_a)}{c_{stock}(\rho_f - \rho_w) - \rho_f} \quad \left[\frac{m^3}{s}\right]. \quad (57)$$

Analogously, the following can be expressed for the fillers:

$$c_a = \frac{m_a}{m_a + m_{w,a}}. \quad (58)$$

Here, $m_a$ represents the mass of the solids in the fillers, and $m_w$ represents the mass of the water. Repeating the procedure above yields the following expression of the filler flow:

$$q_a = \frac{c_a \rho_w q_{a,tot}}{\rho_a + c_d(\rho_w - \rho_a)} \quad \left[\frac{m^3}{s}\right]. \quad (59)$$

Again, $\rho_a$ represents the average density of the fillers [kg/m³], $q_a$ represents the filler flow [m³/s], $\rho_w$ represents the density of water [kg/m³], and $q_{a,tot}$ represents the total ("wet") filler flow [m³/s]. Also, $q_{a,tot}=q_a+q_{a,w}$, where $q_{a,w}$ represents the flow of the water.

The mass flow of dry stock can be expressed as:

$$\dot{m}_{dry} = \dot{m}_f + \dot{m}_a \Rightarrow \dot{m}_{dry} = \rho_f q_f + \rho_a q_a \quad \left[\frac{kg}{s}\right]. \quad (60)$$

Substituting Equation (59) into Equation (57) and substituting the result into Equation (60) yields the following equation:

$$\dot{m}_{dry} = \rho_f \rho_w \frac{c_a(\rho_a(c_s - 1) - c_s \rho_w)q_{a,tot} - (c_a(\rho_a - \rho_w) - \rho_a)c_s q_{tot}}{(c_a(\rho_a - \rho_w) - \rho_a)(c_s(\rho_f - \rho_w) - \rho_f)} - \frac{c_a \rho_a \rho_w q_{a,tot}}{\rho_a + c_a(\rho_w - \rho_a)}. \quad (61)$$

An expression for the dry weight can then be obtained as follows. Let $v_x$ represent the machine speed at the reel 106 (or wherever in the machine 102 that the dry weight is modeled). Also, let $d_y$ represent the sheet width [m]. The dry weight g can then be expressed as:

$$g = \frac{\dot{m}_{dry}}{v_x d_y} \quad \left[\frac{kg}{m^2}\right]. \quad (62)$$

Substituting Equation (61) into this expression may yield the following mathematical model for the dry weight at any point in the paper machine 102:

$$g = \frac{\rho_f \rho_w}{v_x d_y} \left( \frac{c_a(\rho_a(c_s-1) - c_s\rho_w)q_{a,tot} - (c_a(\rho_a - \rho_w) - \rho_a)c_s q_{tot}}{(c_a(\rho_a - \rho_w) - \rho_a)(c_s(\rho_f - \rho_w) - \rho_f)} - \frac{c_a \rho_a \rho_w q_{a,tot}}{\rho_a + c_a(\rho_w - \rho_a)} \right). \quad (63)$$

The mass flow balance indicates that the mass flow into a system equals the mass flow out of the system at steady-state. An example of a non-steady state (a transient state) occurs when the speed of the paper machine 102, the stock flow, or the retention flow is changed. The transport time through the paper machine 102 (such as from the valve 126 in the case of the stock flow) delays the effect on the reel 106 when, for example, the stock flow is changed. A more appropriate expression of the dry weight is therefore one with the time delays considered, meaning the lag time is subtracted as shown below:

$$v_x = v_x(t - t_{d,speed})$$

$$q_a = q_a(t - t_{d,fillers})$$

$$q_{a,tot} = q_{a,tot}(t - t_{d,fillers})$$

$$c_a = c_a(t - t_{d,fillers})$$

$$q_{tot} = q_{tot}(t - t_{d,stock})$$

$$c_{stock} = c_{stock}(t - t_{d,stock}) \quad (64)$$

Here, $t_{d,speed}$ represents the transportation time for the sheet 104 through the paper machine 102 (from the headbox 108 to the point in the machine 102 to be modeled). Also, $t_{d,stock}$ represents the transportation time for the stock from the stock valve 126 to the reel 106 (or the point in the machine 102 to be modeled). In addition, $t_{d,filler}$ represents the transportation time for the fillers to reach the reel 106 (or the point in the machine 102 to be modeled).

The stock flow transportation delay $t_{d,stock}$ may be a function of the flow velocity for the stock in the pipes from the stock valve 126 to the headbox 108. It may also be a function of the machine speed. The following can therefore be obtained:

$$t_{d,stock} = t_{d,pipes} + t_{d,machine} [s], \quad (65)$$

where $t_{d,pipes}$ represents the transportation time for the stock from the stock valve 126 to the outlet of the headbox 108 (which could be constant). The transport delay $t_{d,machine}$ for the stock from the headbox 108 to the reel 106 can be calculated as:

$$t_{d,machine} = \frac{l_{machine}}{v_x(t)} \ [s], \quad (66)$$

where $v_x$ represents the machine speed [m/s], and $l_{machine}$ represents the sheet length from the headbox 108 to the reel 106 [m]. The consolidated expression for the transportation delay can be given by:

$$t_{d,stock} = t_{d,pipes} + \frac{l_{machine}}{v_x(t)} \ [s]. \quad (67)$$

The filler flow and filler consistency transportation delay can include a fixed portion and a variable portion. The total delay is then given by:

$$t_{d,fillers} = t_{d,fillers-pipes} + \frac{l_{machine}}{v_x(t)} \ [s]. \quad (68)$$

Dynamics in the Model

The non-linear models derived above may represent purely static models. Dynamic models can also be derived for moisture or dry weight. In the case of the moisture model, this could involve expanding the ordinary differential equations to partial differential equations. Solving the ordinary differential equations in the moisture model may already represent a relative lengthy operation. As a result, to support real-time simulation, a simpler technique for dynamically modeling the moisture or dry weight can be used.

The approach here involves using "filtered" inputs to the non-linear models. Dynamics can be added to the models by filtering the inputs to the non-linear models. For example, an ordinary MIMO system can be set up for the complete model, but the SISO models in that MIMO model act as filters for the inputs to the non-linear model. Those SISO models could have a unit gain.

Figure 8A:
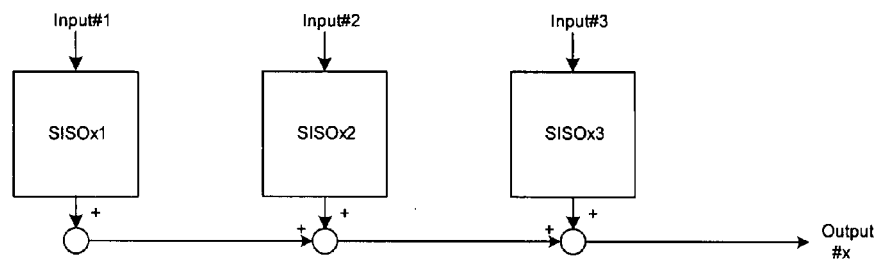
Figure 8B:
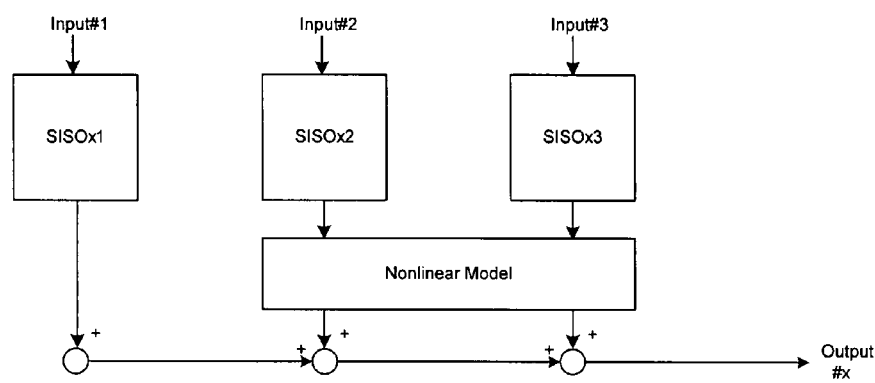

Examples of this are shown in FIGS. 8A and 8B. In FIG. 8A, a MISO building block forming part of an "ordinary" MIMO model is shown. The outputs from each SISO model in the MISO model are summed to form the value for a controlled variable. In FIG. 8B, a MISO model includes a non-linear model (for inputs #2 and #3). The outputs from the second and third SISO models are used as inputs to the static non-linear model. The results from the static non-linear model are summed with the output from the first SISO model to form the value for a controlled variable. It should be noted that these are for illustration only. A MISO model could include any number of SISO and non-linear models in any suitable arrangement.

Figure 9:
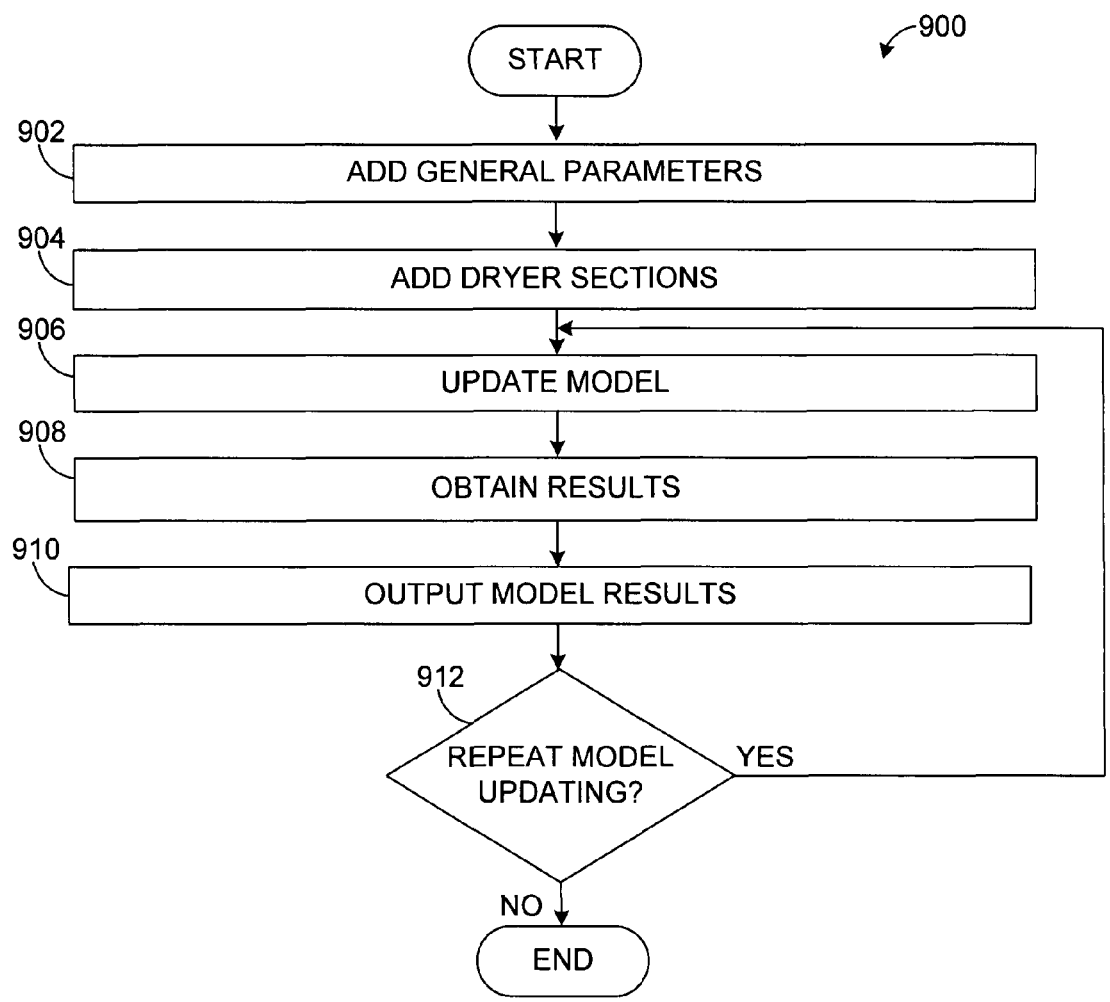
Figure 10:
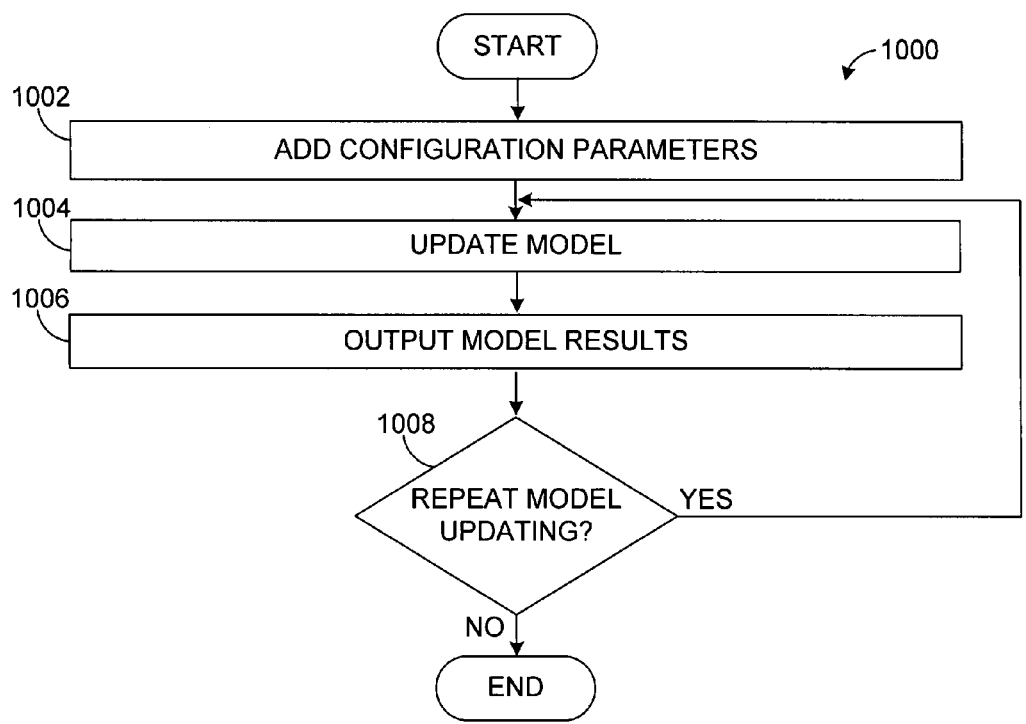

The non-linear moisture/dryer model and the non-linear dry weight model could be used as shown in FIGS. 9 and 10. In FIG. 9, a method 900 for defining and calling the non-linear moisture/dryer model is shown. General parameters are added to the moisture/dryer model at step 902. This could include, for example, setting the value of physical constants used in the model. One or more dryer sections are added to the model at step 904. This could include, for example, adding a dryer section for each dryer cylinder used in the dryer section 114 of the paper machine 102. The model is updated at step 906 and the results of the update are obtained at step 908. As a particular example, since the model may be static, this could include calculating the steady-state moisture level of the sheet 104 at each dryer section. The results obtained using the model (the moisture content of the sheet 104) are output at step 910. If the model needs to be updated again at step 912, the method 900 returns to step 906.

FIG. 10 illustrates a method 1000 for defining and calling the non-linear dry weight model. Configuration parameters are added to the model at step 1002. This could include, for example, configuring different parameters associated with the operation of the paper machine 102. The model is then updated at step 1004. This could include, for example, calculating the static dry weight of the sheet 104 given inputs to the model and the configuration parameters. The results obtained using the model (the dry weight of the sheet 104) are output at step 1006. If the model needs to be updated again at step 1008, the method 1000 returns to step 1004.

The process simulator 202 may also support various support functions, or functions that are not part of the simulation functionality but that support the use of the simulation functionality. For example, the process simulator 202 could support a unit conversion function and a warning handling function.

Figure 11:
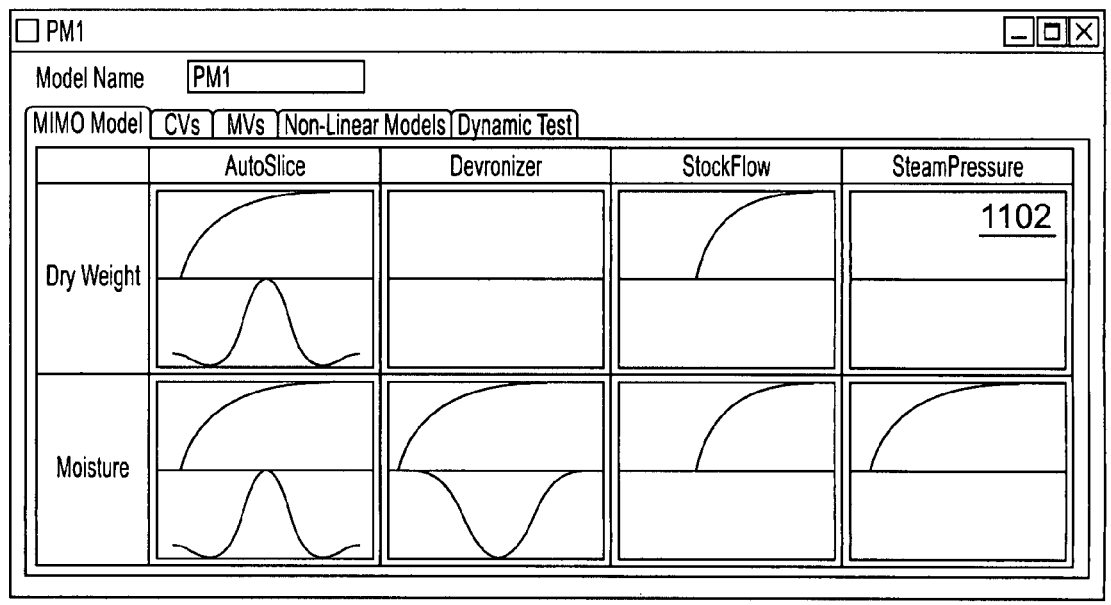

FIG. 11 illustrates an example user interface 1100 that could be presented to a user of the process simulator 202 (such as via the simulation client 214). The user interface 1100 in this example presents the user with a graphical interface containing step responses from various inputs (slice opening of headbox, Devronizer, stock flow, and steam pressure) to various outputs (dry weight and moisture content). For each input-output combination, an entry 1102 includes a spatial response (if any) drawn on top and a dynamic response (if any) drawn below. Models without a spatial component could have a non-array based input, or the input array could include a single element.

Figure 12:
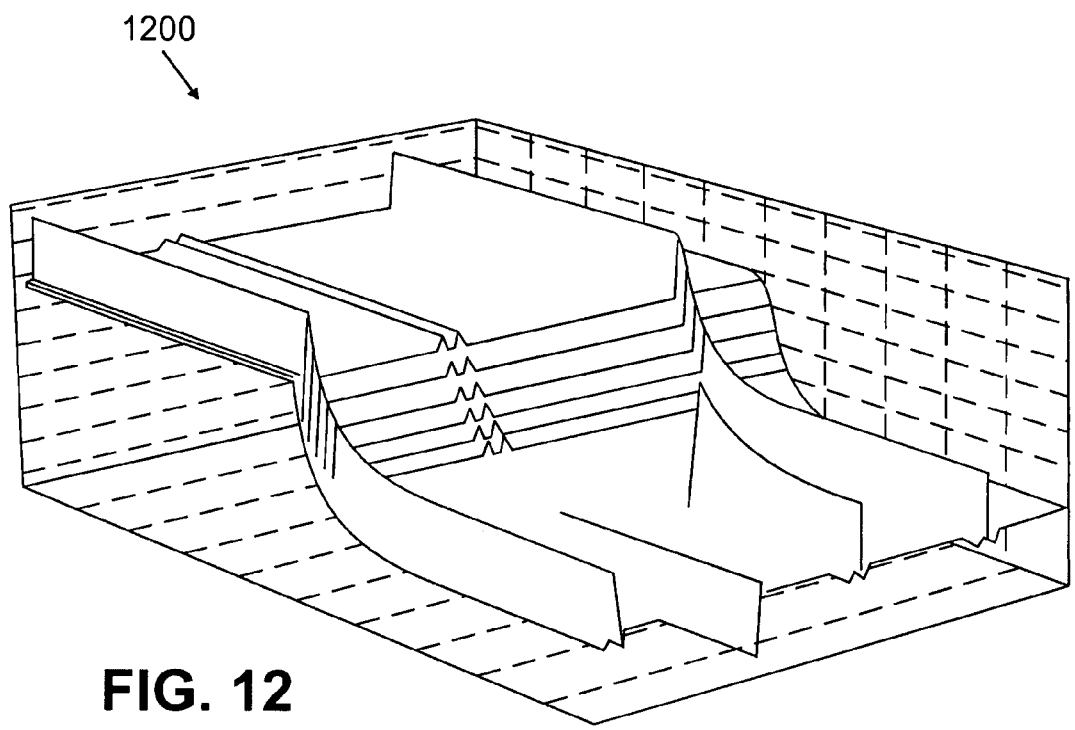

FIG. 12 illustrates another example user interface 1200 that could be presented to a user of the process simulator 202. The user interface 1200 in this example presents the user with a three-dimensional simulator graph of an output array. The output array could represent the dry weight of the sheet 104. The user interface 1200 illustrates the dry weight's response to step changes in the slice opening (represented by 150 slice actuators) and a step change in the stock flow. The user interface 1200 allows a user to quickly identify the effects of various changes on the dry weight of the sheet 104.

The above description and its associated figures have described and illustrated various aspects of one particular implementation of the process simulator 202. Other embodiments of the process simulator 202 could be used without departing from the scope of this disclosure. For example, other models, user interfaces, and methods could be used in the process simulator 202.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating a multi-dimensional non-linear multivariable model of a process, the model defined using multiple building blocks;
providing multiple process input arrays to the model;
simulating a behavior of the process using the model in real-time using at least one processor; and
providing one or more process output arrays of the model, wherein the one or more process output arrays identify the simulated behavior of the process;
wherein the building blocks comprise, for each process output array:
at least one linear discrete time transfer function block having at least one first spatial mapping matrix and configured to receive at least one of the process input arrays;
a non-linear static map block configured to receive at least one output array from the at least one linear discrete time transfer function block; and
a linear transfer function block having a second spatial mapping matrix and configured to receive an output array from the non-linear static map block and to generate that process output array.

2. The method of claim 1, wherein the model comprises a two-dimensional non-linear multivariable model having a spatial dimension and a temporal dimension.

3. The method of claim 1, further comprising:
simulating operation of one or more process controllers to generate the process input arrays;
simulating one or more disturbances that affect the one or more process output arrays;
combining the one or more disturbances to the one or more process output arrays to generate one or more modified process output arrays; and
simulating operation of one or more sensors using the one or more modified process output arrays to generate one or more simulated sensor measurement profiles.

4. The method of claim 1, wherein providing the process input arrays to the model comprises:
receiving one or more regulatory loop process value setpoints; and
simulating regulatory loop dynamics in the process to produce one or more simulated changes to one or more process variables, the one or more process variables associated with the process.

5. The method of claim 4, wherein simulating the behavior of the process using the model and providing the one or more process output arrays of the model comprise:
receiving the simulated changes to the one or more process variables;
using the model to determine how the one or more simulated changes to the one or more process variables affect one or more simulated variables, the one or more simulated variables associated with the process; and
outputting one or more values associated with the one or more simulated variables.

6. The method of claim 5, further comprising at least one of:
simulating a disturbance in the one or more values associated with the one or more simulated variables; and simulating measurements of the one or more simulated variables by one or more sensors to produce a simulated measurement profile.

7. The method of claim 1, wherein the model comprises at least one of:
    a multi-dimensional non-linear multivariable model associated with a moisture of a paper sheet produced by a paper machine; and
    a multi-dimensional non-linear multivariable model associated with a dry weight of the paper sheet.

8. The method of claim 7, wherein providing the one or more process output arrays of the model comprises:
    providing, to a quality control system associated with the paper machine, at least one of: the one or more process output arrays of the model, and one or more values based on the one or more process output arrays of the model.

9. An apparatus comprising:
    at least one memory operable to store a multi-dimensional non-linear multivariable model of a process, the model defined using multiple building blocks; and
    at least one processor operable to:
        provide multiple process input arrays to the model;
        simulate a behavior of the process using the model in real-time; and
        provide one or more process output arrays of the model, wherein the one or more process output arrays identify the simulated behavior of the process;
    wherein the building blocks comprise, for each process output array:
        at least one linear discrete time transfer function block having at least one first spatial mapping matrix and configured to receive at least one of the process input arrays;
        a non-linear static map block configured to receive at least one output array from the at least one linear discrete time transfer function block; and
        a linear transfer function block having a second spatial mapping matrix and configured to receive an output array from the non-linear static map block and to generate that process output array.

10. The apparatus of claim 9, wherein the multiple building blocks approximate a behavior of a multi-dimensional non-linear multivariable process.

11. The apparatus of claim 9, wherein the at least one processor is operable to provide the process input arrays to the model by:
    receiving one or more regulatory loop process value setpoints; and
    simulating regulatory loop dynamics in the process to produce one or more simulated changes to one or more process variables, the one or more process variables associated with the process.

12. The apparatus of claim 11, wherein the at least one processor is operable to simulate the behavior of the process using the model and to provide the one or more process output arrays of the model by:
    receiving the simulated changes to the one or more process variables;
    using the model to determine how the one or more simulated changes to the one or more process variables affect one or more simulated variables, the one or more simulated variables associated with the process; and
    outputting one or more values associated with the one or more simulated variables.

13. The apparatus of claim 12, wherein the at least one processor is further operable to at least one of:
    simulate a disturbance in the one or more values associated with the one or more simulated variables; and
    simulate measurements of the one or more simulated variables by one or more sensors to produce a simulated measurement profile.

14. The apparatus of claim 9, wherein the model comprises at least one of:
    a multi-dimensional non-linear multivariable model associated with a moisture of a paper sheet produced by a paper machine; and
    a multi-dimensional non-linear multivariable model associated with a dry weight of the paper sheet.

15. The apparatus of claim 14, wherein:
    the apparatus forms part of or communicates with a quality control system associated with the paper machine; and
    the apparatus provides to the quality control system at least one of: the one or more process output arrays of the model, and one or more values based on the one or more process output arrays of the model.

16. A non-transitory computer readable medium embodying storing a computer program, the computer program comprising:
    computer readable program code for providing multiple process input arrays to a multi-dimensional non-linear multivariable model, the model defined using multiple building blocks;
    computer readable program code for simulating a behavior of the process using the model in real-time; and
    computer readable program code for providing one or more process output arrays of the model, wherein the one or more process output arrays identify the simulated behavior of the process;
    wherein the building blocks comprise, for each process output array:
        at least one linear discrete time transfer function block having at least one first spatial mapping matrix and configured to receive at least one of the process input arrays;
        a non-linear static map block configured to receive at least one output array from the at least one linear discrete time transfer function block; and
        a linear transfer function block having a second spatial mapping matrix and configured to receive an output array from the non-linear static map block and to generate that process output array.

17. The computer readable medium of claim 16, further comprising:
    computer readable program code for generating the model using at least one of: a single input, single output (SISO) model and a multiple input, single output (MISO) model;
    wherein each SISO and MISO model is defined using the at least one linear discrete time transfer function, the non-linear static map, and the linear transfer function.

18. A system comprising:
    at least one processor configured to execute a process simulator, the process simulator comprising a plurality of components, the components comprising a multi-dimensional non-linear multivariable model of a process, the model defined using multiple building blocks and associated with multiple process input arrays and at least one process output array, wherein the process simulator is operable to use the model to simulate a behavior of the process in real-time; and
    at least one memory operable to store the multi-dimensional non-linear multivariable model;

wherein the building blocks comprise, for each process output array:
- at least one linear discrete time transfer function block having at least one first spatial mapping matrix and configured to receive at least one of the process input arrays;
- a non-linear static map block configured to receive at least one output array from the at least one linear discrete time transfer function block; and
- a linear transfer function block having a second spatial mapping matrix and configured to receive an output array from the non-linear static map block and to generate that process output array.

19. The system of claim 18, wherein the components further comprise at least one of:
- a regulatory loop simulator operable to simulate regulatory loop dynamics in the process;
- a disturbance generator operable to simulate a disturbance in one or more values associated with the simulation of the process; and
- a scanner simulator operable to simulate measurements by one or more sensors in the process.

20. The system of claim 19, wherein the process simulator has a sink/source architecture where a number of each of the components, an arrangement of the components, and connections associated with inputs and outputs of the components are configurable.

21. The system of claim 20, wherein the components comprise distributable objects defined in an object-oriented programming environment, the components accessible to both local and remote simulation clients.

22. The system of claim 20, wherein:
- the process comprises an industrial process;
- the system further comprises a configuration file associated with the industrial process; and
- the process simulator is operable to configure the components based on the configuration file.

23. The method of claim 1, wherein providing the multiple process input arrays, simulating the behavior of the process, and providing the one or more process output arrays are performed without using a process controller that controls and alters the process using the model.

* * * * *